(12) United States Patent
He et al.

(10) Patent No.: US 8,902,976 B2
(45) Date of Patent: Dec. 2, 2014

(54) HYBRID ENCODING AND DECODING METHODS FOR SINGLE AND MULTIPLE LAYERED VIDEO CODING SYSTEMS

(75) Inventors: Yuwen He, San Diego, CA (US); Athanasios Leontaris, Mountain View, CA (US); Walt J. Husak, Simi Valley, CA (US); Alexandros Tourapis, Milpitas, CA (US)

(73) Assignee: Dolby Laboratories Licensing Corporation, San Francisco, CA (US)

( * ) Notice: Subject to any disclaimer, the term of this patent is extended or adjusted under 35 U.S.C. 154(b) by 0 days.

(21) Appl. No.: 14/115,049

(22) PCT Filed: Jul. 9, 2012

(86) PCT No.: PCT/US2012/045987
§ 371 (c)(1),
(2), (4) Date: Oct. 31, 2013

(87) PCT Pub. No.: WO2013/009716
PCT Pub. Date: Jan. 17, 2013

(65) Prior Publication Data
US 2014/0198842 A1    Jul. 17, 2014

Related U.S. Application Data

(60) Provisional application No. 61/506,018, filed on Jul. 8, 2011, provisional application No. 61/582,257, filed on Dec. 31, 2011.

(51) Int. Cl.
*H04N 7/12* (2006.01)
(Continued)

(52) U.S. Cl.
CPC ... *H04N 19/00321* (2013.01); *H04N 19/00436* (2013.01); *H04N 19/00545* (2013.01); *H04N 19/00769* (2013.01); *H04N 19/00781* (2013.01); *H04N 19/00903* (2013.01); *H04N 19/00757* (2013.01); *H04N 19/00684* (2013.01); *H04N 19/00775* (2013.01); *H04N 19/00896* (2013.01); *H04N 19/00951* (2013.01)
USPC .................................................. 375/240.03

(58) Field of Classification Search
CPC .................. H04N 19/00321; H04N 19/00436; H04N 19/00545; H04N 19/00684; H04N 19/00757; H04N 19/00769; H04N 19/00775; H04N 19/00781; H04N 19/00896; H04N 19/00903; H04N 19/00951
USPC ...................................................... 375/240.03
See application file for complete search history.

(56) References Cited

U.S. PATENT DOCUMENTS

| 8,363,724 B2 | 1/2013 | Su et al. |
| 2012/0026288 A1 | 2/2012 | Tourapis |

(Continued)

FOREIGN PATENT DOCUMENTS

| WO | 2011/054879 | 5/2001 |
| WO | 2011/005624 | 1/2011 |

OTHER PUBLICATIONS

A Frame Compatible System for 3D Delivery_ISO-IEC JTC1-SC29 WG11 MPEG2010 M17925_Jul. 2010_Geneva_Switzerland.*
"Advanced video coding for generic audiovisual services", http://www.itu.int/rec/TREC-H.264-201003-I/en, Mar. 2010. Website accessed Jul. 14, 2011.

(Continued)

*Primary Examiner* — Sath V Perungavoor
*Assistant Examiner* — Dakshesh Parikh

(57) ABSTRACT

Encoding and decoding methods for single and multiple layered video coding systems are provided. Specifically, video information provided to a base layer and one or more enhancement layers can be coded using a picture coding mode and/or a residual coding mode. Selection between coding modes can be performed on a region-by-region basis.

32 Claims, 16 Drawing Sheets

(51) Int. Cl.
  *H04N 19/187* (2014.01)
  *H04N 19/33* (2014.01)
  *H04N 19/46* (2014.01)
  *H04N 19/597* (2014.01)
  *H04N 19/61* (2014.01)
  *H04N 19/85* (2014.01)
  *H04N 19/59* (2014.01)
  *H04N 19/51* (2014.01)
  *H04N 19/60* (2014.01)
  *H04N 19/82* (2014.01)
  *H04N 19/91* (2014.01)

(56) References Cited

U.S. PATENT DOCUMENTS

2012/0250769 A1* 10/2012 Bross et al. .............. 375/240.16
2013/0106998 A1  5/2013  Pahalawatta
2013/0114680 A1  5/2013  Leontaris
2013/0121416 A1  5/2013  He

OTHER PUBLICATIONS

Tourapis, Alexis Michael et al. "A Frame Compatible System for 3D Delivery" MPEG Meeting, Jul. 26-30, 2010, Motion Picture Expert Group or ISO/IEC JTC1.

* cited by examiner

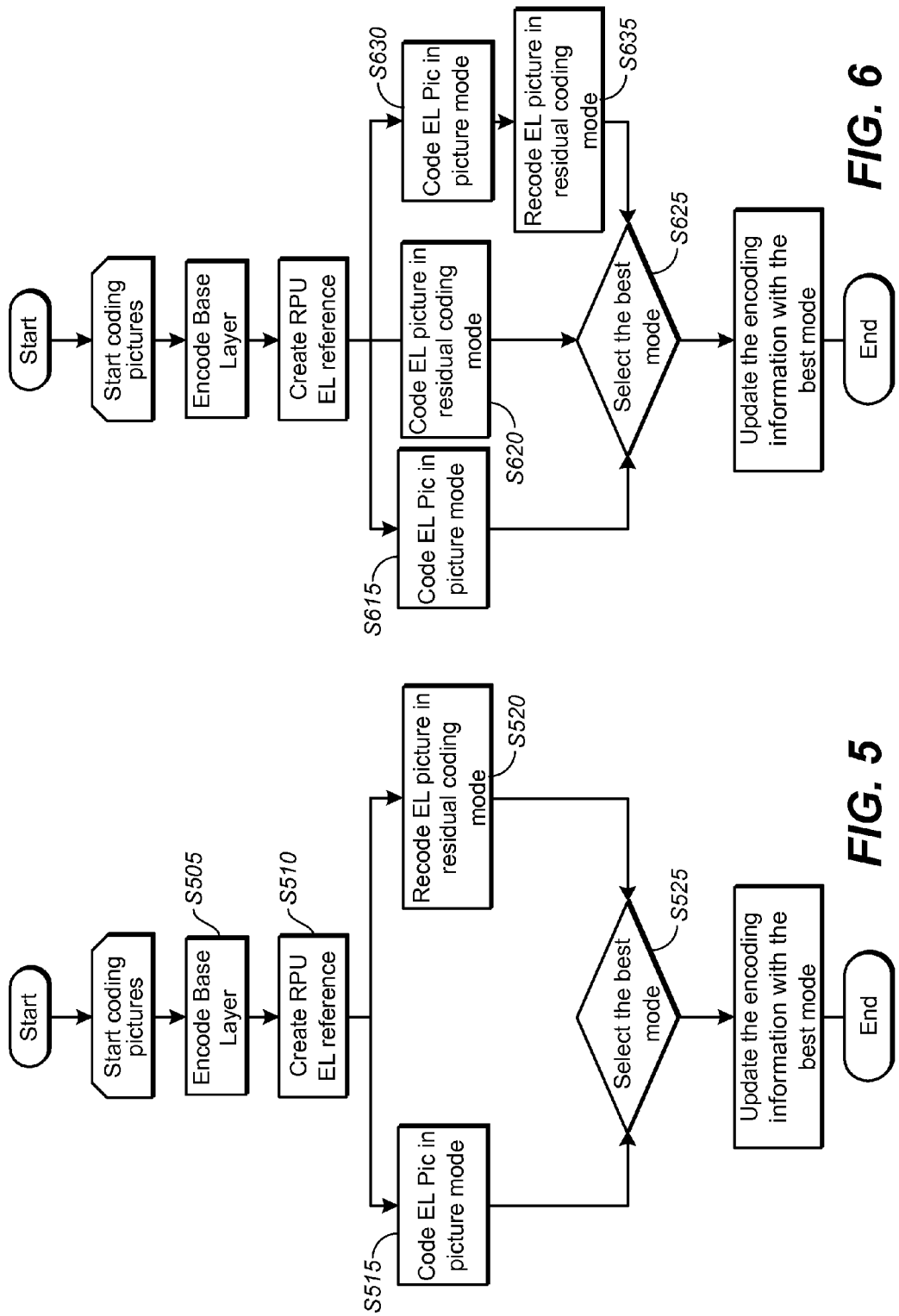

HYBRID ENCODING AND DECODING METHODS FOR SINGLE AND MULTIPLE LAYERED VIDEO CODING SYSTEMS

CROSS-REFERENCE TO RELATED APPLICATIONS

This application is the U.S. national stage of International Application PCT/US2012/045987 filed on Jul. 9, 2012, which in turn claims priority to U.S. Provisional Patent Application Nos. 61/506,018 filed Jul. 8, 2011 and 61/582,257 filed Dec. 31, 2011, each one hereby incorporated by reference in its entirety.

TECHNICAL FIELD

The present invention relates generally to video processing. More in particular, an embodiment of the present invention relates to hybrid encoding and decoding methods for single and multiple layered video coding systems.

BRIEF DESCRIPTION OF DRAWINGS

The accompanying drawings, which are incorporated into and constitute a part of this specification, illustrate one or more embodiments of the present disclosure and, together with the description of example embodiments, serve to explain the principles and implementations of the disclosure.

FIG. 5 depicts an example flowchart of adaptive encoding at an enhancement layer.

FIG. 6 depicts another example flowchart of adaptive encoding at an enhancement layer.

DESCRIPTION OF EXAMPLE EMBODIMENTS

Figure 1:
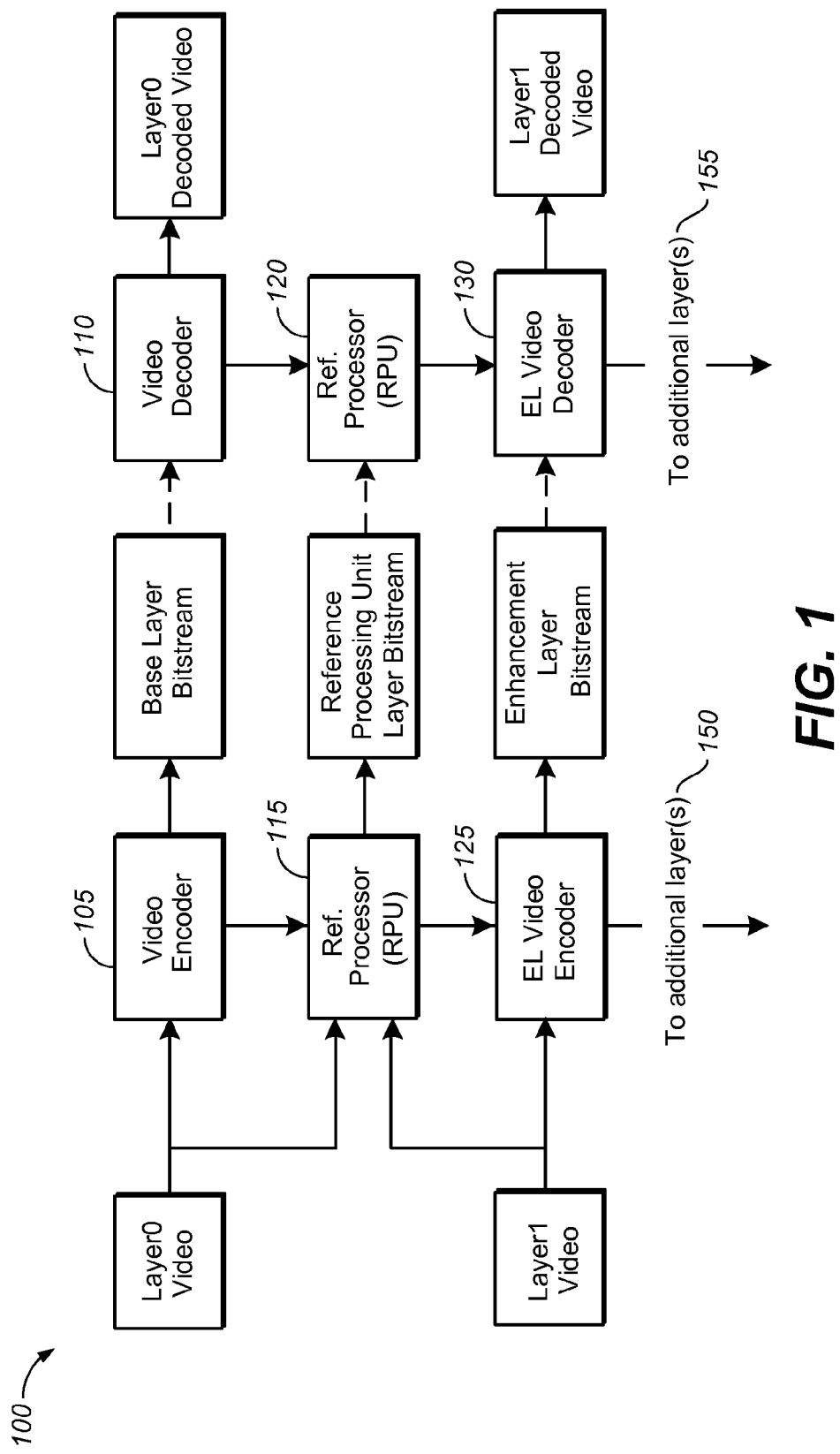
FIG. 1 depicts an example system that supports a base layer and at least one enhancement layer.

In an example embodiment of the disclosure, a method for encoding video image data into a bitstream is provided, the method comprising: a) providing the video image data, the video image data comprising residual pictures; b) performing disparity estimation and/or disparity compensation based on reference pictures from one or more reference picture buffers and the provided residual pictures in the video image data to generate disparity compensated-prediction (codec-prediction) pictures; c) taking a difference between the provided residual pictures and the codec-prediction pictures to generate a first set of residual information; d) performing transformation and quantization on the first set of residual information to obtain a processed first set of residual information; and e) performing entropy encoding on the processed first set of residual information to generate the bitstream.

In an example embodiment of the disclosure, a method for encoding video image data into a bitstream is provided, the method comprising: a) performing disparity estimation and/or disparity compensation based on reconstructed reference pictures generated from residual type reference pictures and input pictures of the video image data to provide a plurality of disparity compensated-prediction (codec-prediction) pictures; b) taking a difference between the input pictures of the video image data and the codec-prediction pictures to provide a first set of residual information; c) performing transformation and quantization on the first set of residual information to obtain a processed first set of residual information; and d) performing entropy encoding on the processed first set of residual information to generate the bitstream.

In an example embodiment of the disclosure, a method for decoding a bitstream to obtain output images is provided, the method comprising: a) providing the bitstream, wherein the bitstream comprises encoded image data of picture information; b) performing entropy decoding on the bitstream to obtain a processed first set of residual information; c) performing inverse quantization and inverse transformation on the processed first set of residual information to obtain a second set of residual information; d) performing disparity compensation based on reconstructed reference pictures of picture information generated from residual type reference pictures from a residual type reference picture buffer and disparity parameters, wherein the disparity parameters are adapted to receive from an encoder; and e) combining the codec-prediction pictures and the second set of residual information to obtain reconstructed images, wherein the reconstructed images are adapted to be stored in a picture type reference picture buffer and the output images are based on the reconstructed images.

In an example embodiment of the disclosure, a method for decoding a bitstream to obtain output images is provided, the method comprising: a) providing the bitstream, wherein the bitstream comprises encoded image data of residual information; b) performing entropy decoding on the bitstream to obtain a processed first set of residual information; c) performing inverse quantization and inverse transformation on the processed first set of residual information to obtain a second set of residual information; d) performing disparity compensation based on reference pictures from one or more reference picture buffers and disparity parameters, wherein the disparity parameters are adapted to receive from an encoder; e) combining the codec-prediction pictures and the second set of residual information to obtain codec-based reconstructed images; f) generating reference processing unit-prediction (rpu-prediction) pictures from a reference processing unit based on reference pictures from one or more reference picture buffers; and g) combining the codec-based reconstructed images and the rpu-prediction pictures to generate reference processing unit-based (rpu-based) reconstructed images, wherein the rpu-based reconstructed images are adapted to be stored in a picture type reference picture buffer and the output images are based on the rpu-based reconstructed images.

In an example embodiment of the disclosure, a method for generating a new reference picture is provided, the method comprising: a) providing video image data based on an input video signal; b) performing disparity estimation and disparity compensation based on reference pictures from one or more reference picture buffers and pictures of the video image data to provide disparity compensated-prediction (codec-prediction) pictures, wherein the reference pictures comprise residual information or picture information; c) taking a difference between the pictures of the video image data and the codec-prediction pictures to provide a first set of residual information; d) performing transformation and quantization on the first set of residual information to obtain a processed first set of residual information; e) performing inverse quantization and inverse transformation on the processed first set of residual information to obtain a second set of residual information; and f) generating the new reference picture of residual information and/or picture information based on the codec-prediction pictures and the second set of residual information, wherein the new reference picture is adapted to be stored in the one or more reference picture buffers.

In an example embodiment of the disclosure, a method for encoding video image data into bitstreams is provided, the method comprising: a) providing the video image data, the video image data comprising pictures for a first layer and pictures for at least one second layer; b) encoding the provided pictures for the first layer to generate a first layer bitstream; c) generating first layer reconstructed pictures based on the provided pictures for the first layer; d) processing the first layer reconstructed pictures by a reference processing unit (RPU) to generate second layer rpu-prediction pictures of picture information, wherein the second-layer rpu-prediction pictures are adapted to be stored in a reference picture buffer of the at least one second layer; e) performing disparity estimation and disparity compensation on the provided pictures of the second layer based on second layer reference pictures of picture information to provide second layer disparity compensated-prediction (codec-prediction) pictures, wherein the second layer reference pictures are based on reference pictures from the reference picture buffer of the at least one second layer; f) taking a difference between the provided pictures of the second layer and the second layer codec-prediction pictures to generate a set of second layer residual information; g) performing transformation and quantization on the set of second layer residual information to obtain processed second layer residual information; and h) performing entropy encoding on the processed second layer residual information to generate a second layer bitstream.

In an example embodiment of the disclosure, a method for encoding video image data into bitstreams is provided, the method comprising: a) providing the video image data, the video image data comprising pictures for a first layer and pictures for at least one second layer; b) encoding the provided pictures for the first layer to generate a first layer bitstream; c) generating first layer reconstructed pictures based on the provided pictures for the first layer; d) processing the first layer reconstructed pictures by a reference processing unit (RPU) to generate at least one second layer rpu-prediction picture of picture information; e) taking a difference between the at least one second layer rpu-prediction picture and the provided pictures of the at least one second layer to generate a set of input residual information for the at least one second layer; f) performing disparity estimation and disparity compensation on the set of input residual information for the at least one second layer based on second layer reference pictures of residual information to provide second layer codec-prediction pictures, wherein the second layer reference picture of residual information is generated by taking a difference between the at least one second layer rpu-prediction picture and reference pictures of picture information from a reference picture buffer of the at least one second layer; g) taking a difference between the set of input residual information for the at least one second layer and the at least one second layer codec-prediction picture to generate a set of second layer residual information; h) performing transformation and quantization on the set of second layer residual information to obtain processed second layer residual information; and i) performing entropy encoding on the processed second layer residual information to generate the bitstream.

In an example embodiment of the disclosure, a method for encoding video image data into bitstreams is provided, the method comprising: a) providing the video image data, the video image data comprising pictures of a first layer and pictures of at least one second layer; b) encoding the provided pictures for the first layer to generate a first layer bitstream; c) generating first layer reconstructed pictures based on the provided pictures for the first layer; d) selecting at least one coding mode, each coding mode being either a picture coding mode or a residual coding mode; and e) performing the at least one selected coding mode; wherein performing the picture coding mode comprises: f) processing the first layer reconstructed pictures by a reference processing unit (RPU) to generate at least one second layer rpu-prediction picture of picture information adapted to be stored in a reference picture buffer of the at least one second layer; g) performing disparity estimation and disparity compensation on the provided pictures of the at least one second layer based on second layer reference pictures of picture information to provide second layer disparity compensated-prediction (codec-prediction) pictures, wherein the second layer reference pictures are based on reference pictures from the reference picture buffer of the at least one second layer; h) taking a difference between the provided pictures of the at least one second layer and the second layer codec-prediction pictures to generate a set of second layer residual information; i) performing transformation and quantization on the second layer residual information to obtain processed second layer residual information; and j) performing entropy encoding on the processed second layer residual information to generate the bitstream, and wherein performing the residual coding mode comprises: f) processing the first layer reconstructed pictures by a reference processing unit (RPU) to generate at least one second layer rpu-prediction picture of picture information; g) taking a difference between the at least one second layer rpu-prediction picture and the provided pictures of the at least one second layer to generate a set of input residual information for the at least one second layer; h) performing disparity estimation and disparity compensation on the set of input residual information for the at least one second layer based on second layer reference pictures of residual information to provide second layer codec-prediction pictures; i) taking a difference between the set of input residual information for the at least one second layer and the at least one second layer codec-prediction picture to generate a set of second layer residual information; j) performing transformation and quantization on the set of second layer residual information to obtain processed second layer residual information; and k) performing entropy encoding on the processed second layer residual information to generate the bitstream.

In an example embodiment of the disclosure, a method for decoding bitstreams to obtain output images is provided, the method comprising: a) providing a first layer bitstream and at least one second layer bitstream, the first layer bitstream comprising encoded image data of a first layer and the at least one second layer bitstream comprising encoded image data of at least one second layer, wherein the encoded image data comprises residual information or picture information; b) decoding the first layer bitstream to generate first layer reconstructed images of picture information, wherein first layer output images are based on the first layer reconstructed images and the first layer reconstructed images are adapted to be: i) stored in a reference picture buffer of the first layer, ii) processed by at least one reference processing unit (RPU) to generate second layer rpu-prediction pictures, and iii) output as decoded first layer output images; c) performing entropy decoding on the at least one second layer bitstream to obtain a processed first set of second layer residual information and second layer disparity parameters signaled from an encoding system; d) performing inverse quantization and inverse transformation on the processed first set of second layer residual information to obtain a second set of second layer residual information; e) performing disparity compensation based on the second layer disparity parameters and second layer reference pictures to obtain second layer codec-prediction pictures, wherein: i) if the encoded image data to be decoded is of residual information, then the second layer reference pictures are generated based on residual type reference pictures, and ii) if the encoded image data to be decoded is of picture information, then the second layer reference pictures are based on picture type reference pictures; f) combining the second layer codec-prediction pictures and the second set of second layer residual information to obtain second layer reconstructed images, wherein the second layer reconstructed images are adapted to be stored in the second layer reference picture buffer, and wherein second layer output images are based on the second layer reconstructed images; and g) generating second layer output images by: i) combining the second layer rpu-prediction pictures and the residual type reference pictures if the encoded image data to be decoded is of residual information, and ii) using the picture type reference pictures as the second layer output images to be the second layer reference pictures if the encoded image data to be decoded is of picture information.

In an example embodiment of the disclosure, an encoding system for encoding video image data into a bitstream is provided, the video image data comprising residual pictures, the encoding system comprising: a) a disparity estimation module and/or a disparity compensation module that are configured to perform respective disparity estimation and/or disparity compensation based on reference pictures from one or more reference picture buffers and the residual pictures in the video image data to generate disparity compensated-prediction (codec-prediction) pictures; b) a first summing module connected with the disparity estimation module or the disparity compensation module and that is configured to take a difference between the residual pictures and the codec-prediction pictures to generate a first set of residual information; c) a transformation module connected with the first summing module and a quantization module, wherein the transformation module and the quantization module are configured to perform respective transformation and quantization on the first set of residual information to obtain a processed first set of residual information; and d) an entropy encoder connected with the quantization module and that is configured to perform entropy encoding on the processed first set of residual information to generate the bitstream.

In an example embodiment of the disclosure, an encoding system for encoding video image data into a bitstream is provided, the encoding system comprising: a) a disparity estimation module and/or a disparity compensation module that are configured to perform respective disparity estimation and/or disparity compensation based on reconstructed reference pictures generated from residual type reference pictures and input pictures of the video image data to provide a plurality of disparity compensated-prediction (codec-prediction) pictures; b) a first summing module connected with the disparity estimation module or the disparity compensation module and that is configured to take a difference between the input pictures of the video image data and the codec-prediction pictures to provide a first set of residual information; c) a transformation module connected with the first summing module and a quantization module, wherein the transformation module and the quantization module are configured to respectively perform transformation and quantization on the first set of residual information to obtain a processed first set of residual information; and d) an entropy encoder connected with the quantization module and that is configured to perform entropy encoding on the processed first set of residual information to generate the bitstream.

In an example embodiment of the disclosure, a decoding system for decoding a bitstream to obtain output images is provided, the bitstream comprising encoded image data of picture information, the decoding system comprising: a) an entropy decoder that is configured to perform entropy decoding on the bitstream to obtain a processed first set of residual information and disparity parameters adapted to be signaled from an encoding system; b) an inverse quantization module connected with the entropy decoder and an inverse transformation module, wherein the inverse quantization module and the inverse transformation module are configured to perform respective inverse quantization and inverse transformation on the processed first set of residual information to obtain a second set of residual information; c) a disparity compensation module connected with the entropy decoder and that is configured to perform disparity compensation based on reconstructed reference pictures of picture information generated from residual type reference pictures from a residual type reference picture buffer and the disparity parameters; and d) a first summing module connected with the disparity compensation module and the inverse transformation module and that is configured to combine the codec-prediction pictures and the second set of residual information to obtain reconstructed images, wherein the reconstructed images are adapted to be stored in a picture type reference picture buffer and the output images are based on the reconstructed images.

In an example embodiment of the disclosure, a decoding system for decoding a bitstream to obtain output images is provided, the bitstream comprising encoded image data of residual information, the decoding system comprising: a) an entropy decoder that is configured to perform entropy decoding on the bitstream to obtain a processed first set of residual information and disparity parameters adapted to be signaled from an encoding system; b) an inverse quantization module connected with the entropy decoder and an inverse transformation module, wherein the inverse quantization module and the inverse transformation module are configured to perform respective inverse quantization and inverse transformation on the processed first set of residual information to obtain a second set of residual information; c) a disparity compensation module connected with the entropy decoder and that is configured to perform disparity compensation based on reference pictures from one or more reference picture buffers and the disparity parameters; d) a first summing module connected with the disparity compensation module and the inverse transformation module and that is configured to combine the codec-prediction pictures and the second set of residual information to obtain codec-based reconstructed images; and e) a reference processing unit connected with one or more reference picture buffers and that is configured to generate reference processing unit-prediction (rpu-prediction) pictures based on reference pictures from the one or more reference picture buffers; and f) a second summing module connected with the first summing module and the reference processing unit and that is configured to combine the codec-based reconstructed images and the rpu-prediction pictures to generate reference processing unit-based (rpu-based) reconstructed images, wherein the rpu-based reconstructed images are adapted to be stored in a picture type reference picture buffer and the output images are based on the rpu-based reconstructed images.

In an example embodiment of the disclosure, a system for generating a new reference picture is provided, wherein the system is adapted to receive video image data based on an input video signal, the system comprising: a) a disparity estimation module connected with a disparity compensation module, wherein the disparity estimation module and disparity compensation module are configured to perform disparity estimation and disparity compensation based on reference pictures from one or more reference picture buffers and pictures of the video image data to provide disparity compensated-prediction (codec-prediction) pictures, wherein the reference pictures comprise residual information or picture information; b) a first summing module connected with the disparity compensation module and that is configured to take a difference between the pictures of the video image data and the codec-prediction pictures to provide a first set of residual information; c) a transformation module connected with the first summing module and a quantization module, wherein the transformation module and the quantization module are configured to perform respective transformation and quantization on the first set of residual information to obtain a processed first set of residual information; d) an inverse quantization module connected with the quantization module and an inverse transformation module, wherein the inverse quantization module and the inverse transformation module are configured to perform respective inverse quantization and inverse transformation on the processed first set of residual information to obtain a second set of residual information; and e) a reconstruction module connected with the inverse transformation module and that is configured to generate the new reference picture of residual information and/or picture information based on the codec-prediction pictures and the second set of residual information, wherein the new reference picture is adapted to be stored in the one or more reference picture buffers.

In an example embodiment of the disclosure, an encoding system for encoding video image data into bitstreams is provided, the video data comprising pictures for a first layer and pictures for at least one second layer, the encoding system comprising: a) a first layer encoder that is configured to encode the pictures for the first layer to generate a first layer bitstream; b) a first layer reconstruction module connected with the first layer encoder and that is configured to generate first layer reconstructed pictures based on the pictures for the first layer; c) a reference processing unit (RPU) connected with the reconstruction module and that is configured to process the first layer reconstructed pictures to generate second layer reference processing unit-prediction (rpu-prediction) pictures of picture information, wherein the second-layer rpu-prediction pictures are adapted to be stored in a reference picture buffer of the at least one second layer; d) a second layer disparity estimation module and a second layer disparity compensation module that are configured to perform respective disparity estimation and disparity compensation on the pictures of the second layer based on second layer reference pictures of picture information to provide second layer disparity compensated-prediction (codec-prediction) pictures, wherein the second layer reference pictures are based on reference pictures from the reference picture buffer of the at least one second layer; e) a first summing module connected with the second layer disparity compensation module and that is configured to take a difference between the pictures of the second layer and the second layer codec-prediction pictures to generate a set of second layer residual information; f) a second layer transformation module connected with the first summing module and a second layer quantization module, wherein the transformation module and the quantization module are configured to perform respective transformation and quantization on the set of second layer residual information to obtain processed second layer residual information; and g) a second layer entropy encoder connected with the second layer quantization module and that is configured to perform entropy encoding on the processed second layer residual information to generate a second layer bitstream.

In an example embodiment of the disclosure, an encoding system for encoding video image data into bitstreams is provided, the video data comprising pictures for a first layer and pictures for at least one second layer, the encoding system comprising: a) a first layer encoder that is configured to encode the pictures for the first layer to generate a first layer bitstream; b) a first layer reconstruction module connected with the first layer encoder and that is configured to generate first layer reconstructed pictures based on the pictures for the first layer; c) a reference processing unit (RPU) connected with the reconstruction module and that is configured to process the first layer reconstructed pictures to generate at least one second layer reference processing unit-prediction (rpu-prediction) picture of picture information; d) a first summing module that is configured to take a difference between the at least one second layer rpu-prediction picture and the pictures of the at least one second layer to generate a set of input residual information for the at least one second layer; e) a second layer disparity estimation module and a second layer disparity compensation module that are configured to perform respective disparity estimation and disparity compensation on the set of input residual information for the at least one second layer based on second layer reference pictures of residual information to provide second layer codec-prediction pictures, wherein the second layer reference picture of residual information is generated by taking a difference between the at least one second layer rpu-prediction picture and reference pictures of picture information from a reference picture buffer of the at least one second layer; f) a second summing module connected with the disparity compensation module and the first summing module and that is configured to take a difference between the set of input residual information for the at least one second layer and the at least one second layer codec-prediction picture to generate a set of second layer residual information; g) a second layer transformation module connected with the first summing module and a second layer quantization module, wherein the transformation module and the quantization module are configured to perform transformation and quantization on the set of second layer residual information to obtain processed second layer residual information; and h) a second layer entropy encoder connected with the second layer quantization module and that is configured to perform entropy encoding on the processed second layer residual information to generate the bitstream.

In an example embodiment of the disclosure, an encoding system for encoding video image data into bitstreams is provided, the video data comprising pictures for a first layer and pictures for at least one second layer, the encoding system comprising: a) a first layer encoder that is configured to encode the pictures for the first layer to generate a first layer bitstream; b) a first layer reconstruction module that is configured to generate first layer reconstructed pictures based on the pictures for the first layer; c) a coding mode selection switch that is configured to select at least one coding mode module, each coding mode module being either a picture coding mode module or a residual coding mode module; and wherein, if selected, the picture coding mode module is configured to perform a picture coding mode, the picture coding mode comprising: d) using a reference processing unit (RPU), processing the first layer reconstructed pictures using a reference processing unit (RPU) to generate at least one second layer rpu-prediction picture of picture information adapted to be stored in a reference picture buffer of the at least one second layer, wherein the reference processing unit is connected with the first layer reconstruction module; e) using a disparity estimation module and a disparity compensation module, performing respective disparity estimation and disparity compensation on the pictures of the at least one second layer based on second layer reference pictures of picture information to provide second layer disparity compensated-prediction (codec-prediction) pictures, wherein the second layer reference pictures are based on reference pictures from the reference picture buffer of the at least one second layer; f) using a first summing module connected with the disparity compensation module, taking a difference between the pictures of the at least one second layer and the second layer codec-prediction pictures to generate a set of second layer residual information; g) using a transformation module and a quantization module, performing respective transformation and quantization on the second layer residual information to obtain processed second layer residual information, wherein the transformation module is connected with the first summing module; and h) using an entropy encoder connected with the quantization module, performing entropy encoding on the processed second layer residual information to generate the bitstream, and wherein, if selected, the residual coding mode module is configured to perform a residual coding mode, the residual coding mode comprising: d) using the reference processing unit (RPU), processing the first layer reconstructed pictures to generate at least one second layer rpu-prediction picture of picture information; e) using a second summing module, taking a difference between the at least one second layer rpu-prediction picture and the pictures of the at least one second layer to generate a set of input residual information for the at least one second layer, wherein the second summing module is connected with the reference processing unit; f) using a disparity estimation module and a disparity compensation module, performing respective disparity estimation and disparity compensation on the set of input residual information for the at least one second layer based on second layer reference pictures of residual information to provide second layer codec-prediction pictures; g) using the first summing module, taking a difference between the set of input residual information for the at least one second layer and the at least one second layer codec-prediction picture to generate a set of second layer residual information, wherein the first summing module is connected with the disparity compensation module; h) using the transformation module and the quantization module, performing respective transformation and quantization on the set of second layer residual information to obtain processed second layer residual information; and i) using the entropy encoder connected with the quantization module, performing entropy encoding on the processed second layer residual information to generate the bitstream.

In an example embodiment of the disclosure, a decoding system for decoding a plurality of bitstreams to obtain output images is provided, the plurality of bitstreams comprising a first layer bitstream and at least one second layer bitstream, wherein the first layer bitstream comprises encoded image data of a first layer and the at least one second layer bitstream comprises encoded image data of at least one second layer, the decoding system comprising: a) a first layer decoder that is configured to decode the first layer bitstream to generate first layer reconstructed images of picture information, wherein first layer output images are based on the first layer reconstructed images and the first layer reconstructed images are adapted to be: i) stored in a reference picture buffer of the first layer, ii) processed by at least one reference processing unit (RPU) to generate second layer rpu-prediction pictures, and iii) output as decoded first layer output images; b) a second layer entropy decoder that is configured to perform entropy decoding on the at least one second layer bitstream to obtain a processed first set of second layer residual information and second layer disparity parameters signaled from an encoding system; c) a second layer inverse quantization module and a second layer inverse transformation module that are configured to perform inverse quantization and inverse transformation on the processed first set of second layer residual information to obtain a second set of second layer residual information, wherein the second layer inverse quantization module is connected with the second layer entropy decoder; d) a second layer disparity compensation module connected with the second layer entropy decoder and that is configured performing disparity compensation based on the second layer disparity parameters and second layer reference pictures to obtain second layer codec-prediction pictures, wherein: i) if the encoded image data to be decoded is of residual information, then the second layer reference pictures are generated based on residual type reference pictures, and ii) if the encoded image data to be decoded is of picture information, then the second layer reference pictures are based on picture type reference pictures; e) a first summing module connected with the second layer inverse transformation module and that is configured to combine the second layer codec-prediction pictures and the second set of second layer residual information to obtain second layer reconstructed images, wherein the second layer reconstructed images are adapted to be stored in the second layer reference picture buffer, and wherein second layer output images are based on the second layer reconstructed images; and wherein second layer output images are generated by: i) using a second summing module connected with the at least one reference processing unit and that is configured to combine the second layer rpu-prediction pictures and the residual type reference pictures if the encoded image data to be decoded is of residual information, and ii) using the picture type reference pictures as the second layer output images to be the second layer reference pictures if the encoded image data to be decoded is of picture information wherein the encoded image data comprises residual information or picture information.

As used herein, the terms "region" and "partition" are used interchangeably and may refer to a pixel, a block of pixels (such as a macroblock or a coding unit), an entire picture or frame, or a collection of pictures/frames (such as a sequence or subsequence). Macroblocks can comprise, by way of example and not of limitation, 4×4, 8×8, and 16×16 pixels within a picture. In general, a region can be of any shape and size.

An example method of segmenting a picture into regions, which can be of any shape and size, takes into consideration image characteristics. For example, a region within a picture can be a portion of the picture that contains similar image characteristics. Specifically, a region can be one or more pixels, macroblocks, or blocks within a picture that contains the same or similar chroma information, luma information, and so forth. The region can also be an entire picture. As an example, a single region can encompass an entire picture when the picture in its entirety is of one color or essentially one color.

As used herein, the terms "original signal" and "original picture" are used interchangeably and may refer to input video or picture information to be encoded by an encoder. By way of example and not of limitation, the original signal/picture can comprise information on one or more views and/or layers, a frame-compatible picture or sequence of pictures, and so forth.

As used herein, the term "image signal" may refer to a signal containing image information pertaining to, for example, a picture, a region of a picture, or a residual.

As used herein, the term "coding" may refer to both encoding and decoding. Similarly, the term "coding system" encompasses either or both of an encoding system and a decoding system.

As used herein, the terms "present layer" or "current layer" are used interchangeably and may refer to a layer presently under consideration. The present layer can thus be a base layer or an enhancement layer.

As used herein, the term "higher priority layer" may refer to a layer that is coded prior to the coding of the present layer. Consequently, the higher priority layer is available to provide inter-layer information for inter-layer prediction of the present layer.

As used herein, the term "first layer" may refer to any layer, such as a base layer or an enhancement layer, whereas the term "second layer" may refer to any layer of lower priority than the first layer. The first layer can be a base layer while the second layer can be an enhancement layer. Alternatively, the first layer can be an enhancement layer while the second layer can be another enhancement layer of lower priority than the first layer.

As used herein, the terms "residual" and "residual picture" are used interchangeably and may refer to a signal representing a difference between two image signals.

As used herein, the term "full resolution" refers to resolution of the original signal/picture.

As used herein, the terms "neighbors" or "neighboring" may refer to spatial neighbors (e.g., involved in intra prediction) within the same picture. It should be noted that spatial neighbors may be far from each other, and a vector can be used to point to these parts of the picture.

As used herein, the term "quality" may refer to both objective video quality and subjective video quality. Objective video quality generally can be quantified. Examples of measures of (objective) video quality include distortion between an expected image and a predicted image, signal to noise ratio (SNR) of an image signal, peak signal-to-noise ratio (PSNR) of an image signal, and so forth.

Subjective video quality refers to the quality of the image as seen by a viewer of the image. Although subjective video quality can also be measured using objective measures of video quality, an increase in objective video quality does not necessarily yield an increase in subjective video quality, and vice versa. Evaluation/measurement of smoothness, sharpness, details, and temporal continuity of an image and content in the image are examples of subjective quality measurement. In relation to images processed using region-based (e.g., block-based) operations, for instance, subjective video quality considerations can involve determining how to process pixels along region boundaries such that perception of artifacts along the region boundaries are reduced in a final displayed image. Such processing is generally referred to as deblocking.

Multi-layered video codecs can provide, by way of example and not of limitation, scalability in spatial and temporal resolution, bit-depth, color gamut, quality, view, and so forth. A scalable bitstream comprises information from multiple layers. These multiple layers comprise a base layer that can be decoded without referencing or depending on any other layer and one or more enhancement layers that build upon (depend on) a base representation provided by the base layer and/or a representation provided by a previous enhancement layer or layers. Used in this sense, the term "previous layer" refers to a layer on which a present layer depends.

As an example, consider a case involving temporal scalability. The base layer may provide a first level of temporal resolution, e.g., 15 frames per second, while decoding of a first temporal enhancement layer may provide a second level of temporal resolution, e.g., 30 frames per second.

The ISO/IEC Moving Picture Experts Group (MPEG) and the ITU-T Video Coding Experts Group (VCEG) have already developed a number of multi-layered video coding standards, such as the Multi-View Coding extension (MVC) and the Scalable Video Coding (SVC) extension of the H.264/MPEG-4 Part 10 standard (see reference [1], incorporated herein by reference in its entirety). In particular, for multi-view scalability, a base layer may provide a representation of a first view, while one or more additional enhancement layers, which may depend on the base layer and/or a previous enhancement layer or layers, may provide representations of one or more additional views. Similarly, in scalable video coding applications, the base layer may provide a first representation of a video signal in a lower resolution/quality, and the one or more additional enhancement layers may provide representations of the video signal at an improved resolution/quality while utilizing information from the base layer and/or a previous enhancement layer or layers.

Compression efficiency in multi-layered coding schemes can be improved through inter-layer prediction. Inter-layer prediction involves predicting samples and/or mode/motion information of an enhancement layer from samples or information coming from the base layer or some higher priority layer. A higher priority layer refers to a layer that is encoded (by an encoder) or decoded (by a decoder) prior to the encoding/decoding of the present layer. Consequently, the higher priority layer is available to provide inter-layer information for inter-layer prediction. As a result, for a given present layer, inter-layer prediction can involve predicting samples and/or mode/motion information of the present layer using information from layers higher in priority relative to the present layer.

Fixed resampling/upsampling can be performed for inter-layer prediction. In general, inter-layer prediction performance can be improved by considering methods (e.g., adaptive on a region basis) that can enhance and better correlate the inter-layer prediction references with pictures of an enhancement layer.

One such method involves utilization of a reference processing unit (RPU) (see references [2]-[6], each of which is incorporated herein by reference in its entirety), where side information is transmitted to a decoding system that signals to the decoding system how to process an inter-layer reference prior to its use for prediction. The RPU can be adapted to align phase, luminance, and frequency between reference pictures from a reference picture buffer and input image data. The side information can be provided in a bitstream (e.g., an encoder-side RPU bitstream) that can instruct a decoder-side RPU which RPU filters or methods to apply for a given picture or region thereof.

The RPU can be used to perform one or more of, for instance, prediction, estimation, denoising, upsampling, downsampling, and so forth on an input to the RPU. For instance, the RPU can perform motion compensation. In general, the RPU provides, by way of example and not of limitation, a guided or directed upsampling, resampling, filtering, and/or processing of input samples. The RPU can apply a method or set of methods to an entire picture or different sets of methods on a region-by-region basis. Methods applied by the RPU are generally adaptive. Methods selected to be applied by an encoding system are generally signaled to a decoding system (e.g., as part of the side information). Such signaling can also include transmission of information such as motion information (e.g., motion vectors).

Processing of inter-layer references prior to their use for prediction has been used, for example, to achieve multi-layered frame-compatible full-resolution (FCFR) video delivery for 3D stereoscopic video compression applications. In such applications, a base layer comprises a frame-compatible representation that contains information from all views (e.g., two views for the case of 3D stereoscopic applications). Additional enhancement layers can then be provided that contain additional information of each view, which can help generate a higher or even a full resolution representation of each view.

Figure 12:
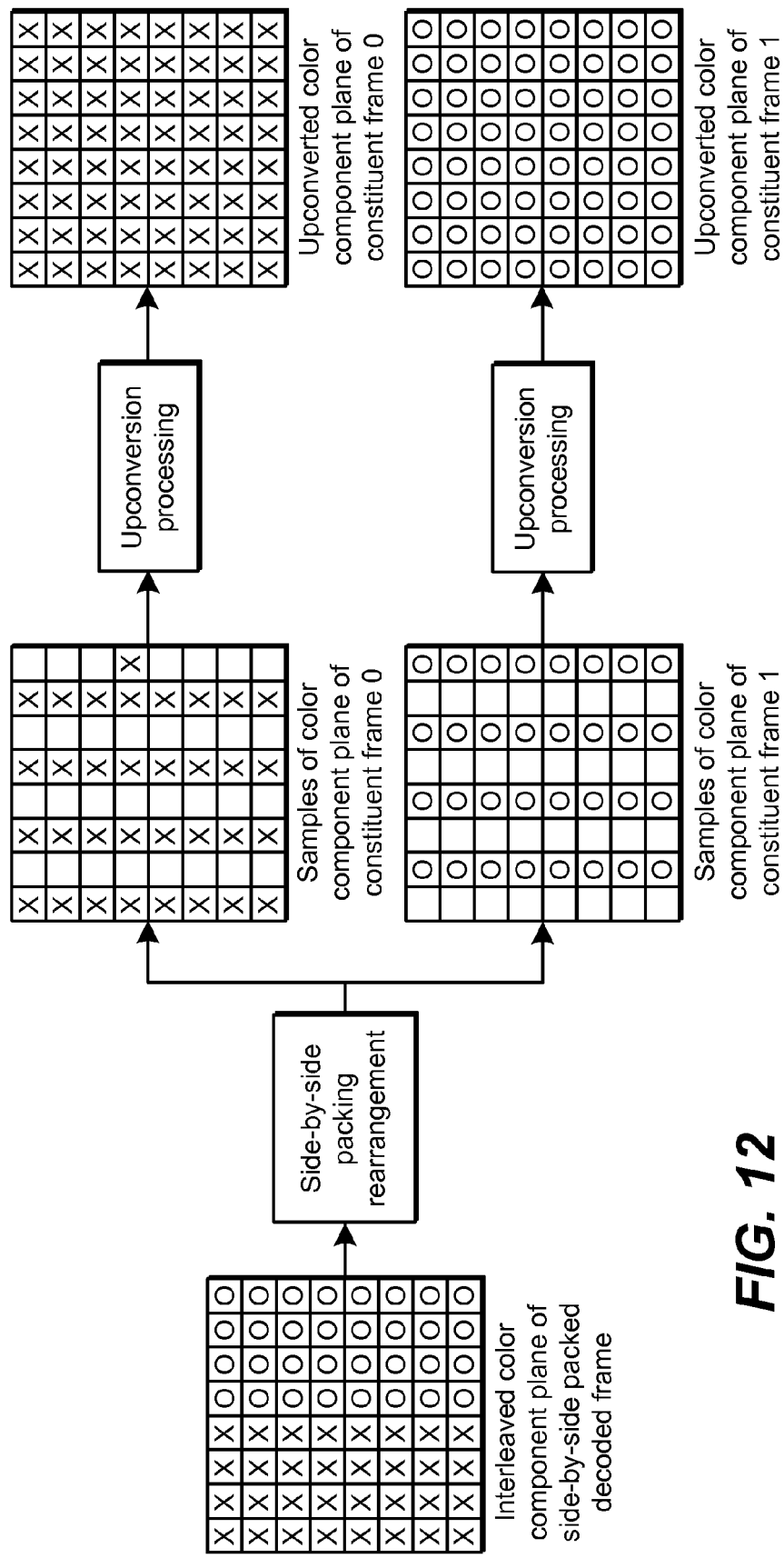
FIG. 12 depicts an example side-by-side frame-compatible representation.
Figure 13:
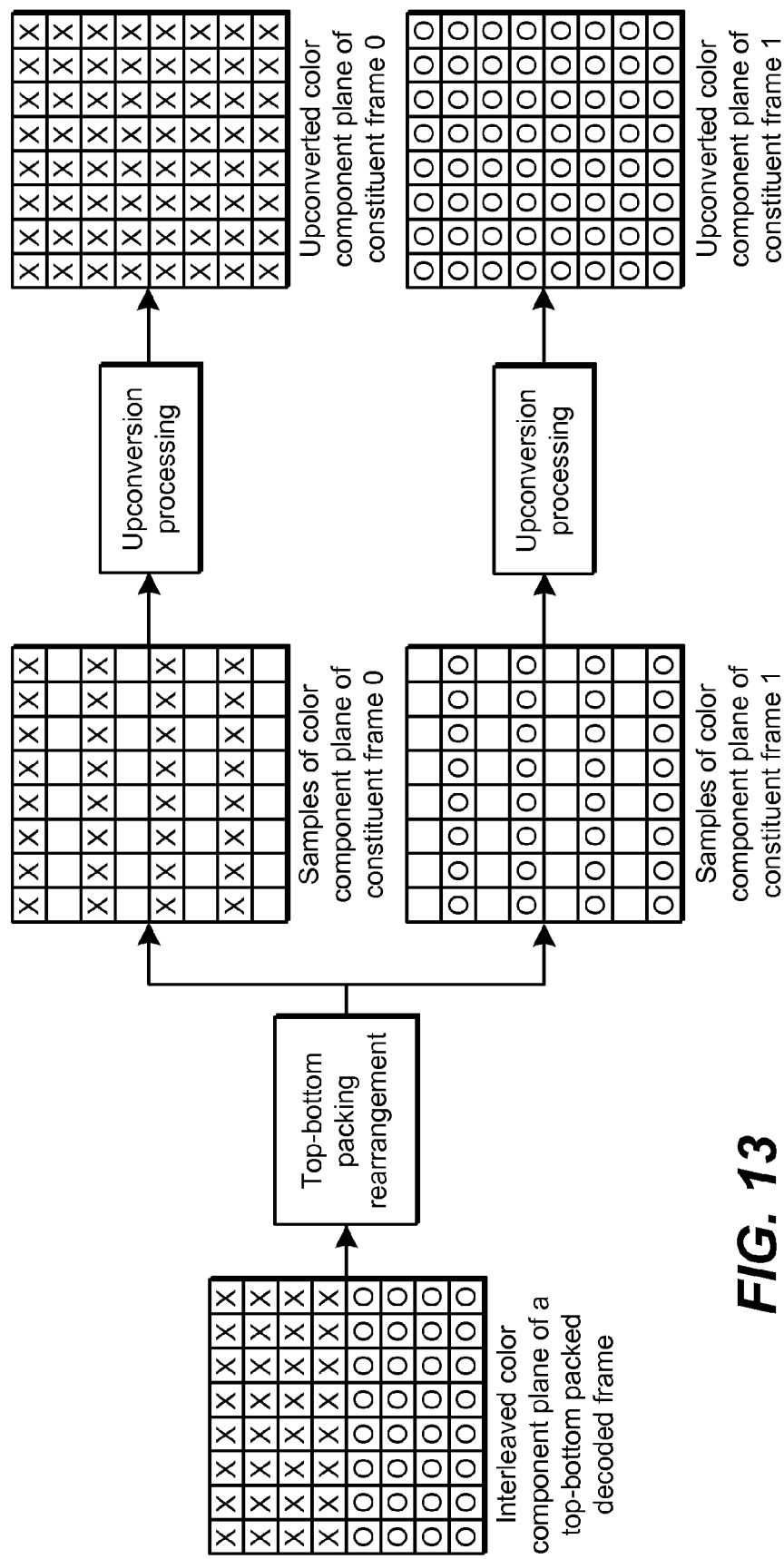
FIG. 13 depicts an example top-and-bottom frame-compatible representation.

Examples of two frame-compatible representations, side-by-side and top-and-bottom, are shown in FIG. 12 and FIG. 13, respectively. Other examples of frame-compatible representations include quincunx/checkerboard interleaved, row-interleaved, column-interleaved, and so forth.

As depicted in FIG. 1, in a system (100) supporting at least two layers, a base layer and an enhancement layer, a reconstructed output picture of a base layer encoder (105)/decoder (110) can be processed by corresponding reference processing units (115, 120) and inserted into a reference picture buffer associated with an enhancement layer encoder (125)/decoder (130) prior to encoding/decoding a corresponding picture in the enhancement layer. This can enable the enhancement layer to use both its own temporal references as well as references from a previously decoded layer for performing, for instance, disparity estimation/compensation. If there is high correlation between images encoded in each layer, additional references from a previously decoded layer or layers can improve coding efficiency of the enhancement layer. Note that the RPUs (115, 120) can also be used for a variety of other scalable applications, including spatial scalability, in addition to stereoscopic (3D) applications. As specified in FIG. 1, the system (100) can support an additional layer or layers (150, 155).

Figure 14:
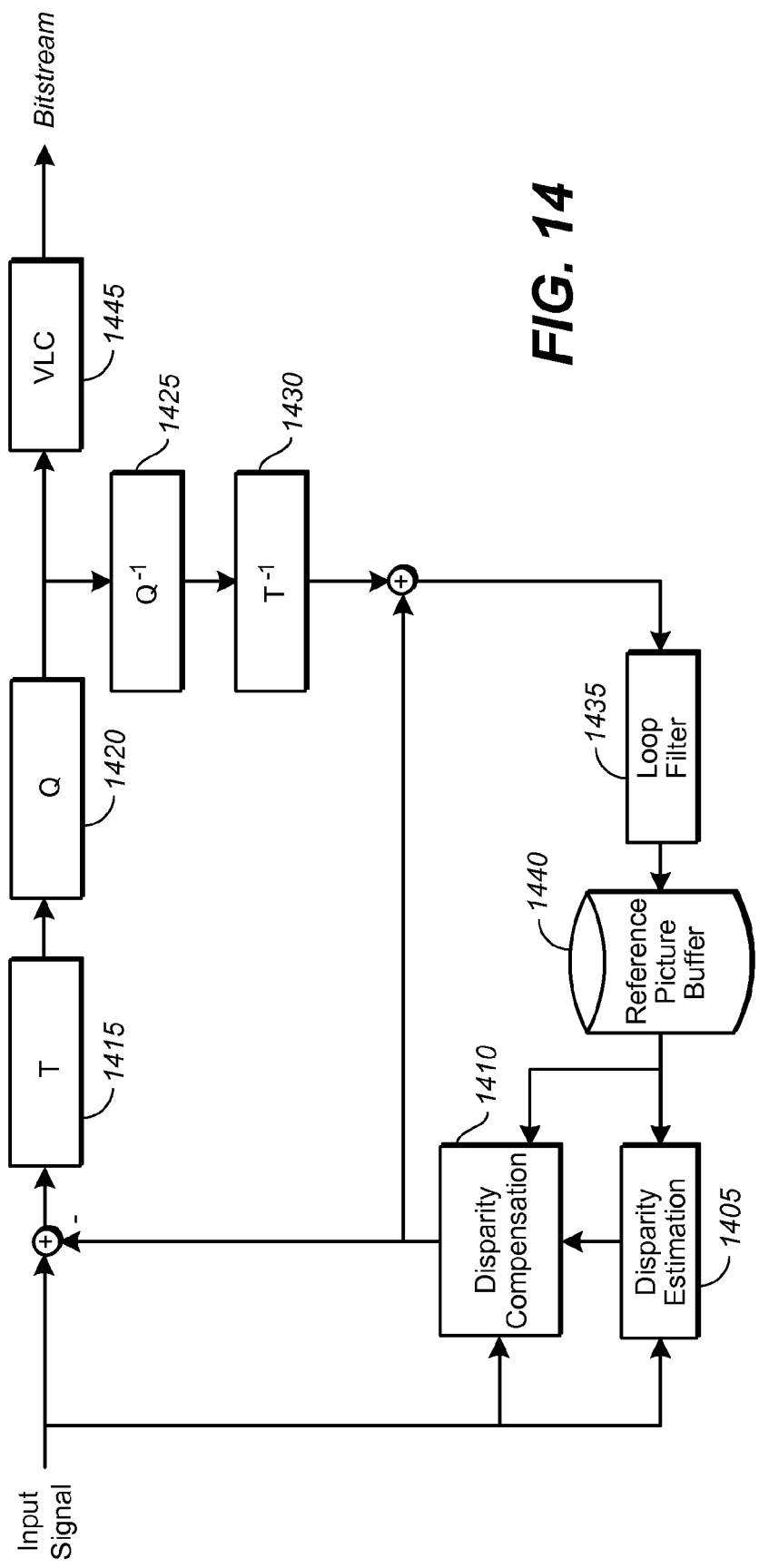
FIG. 14 depicts an example implementation of a single layer video encoder.

FIG. 14 depicts an example implementation of a single layer video encoder. It should be noted that the single layer video encoder shown in FIG. 14 can be used as the base layer encoder and/or the enhancement layer encoder of the system shown in FIG. 1. The video encoder may comprise various components, including but not limited to:

a disparity estimation module (1405) that is configured to perform operations such as mode decision/partition prediction type selection and motion/reference index estimation, weighted prediction parameter estimation, stereo disparity estimation, intra prediction, and so forth, to generate disparity parameters and determine from a large set of possible prediction modes which mode is most appropriate and efficient to use for a particular application or given certain performance requirements (e.g., quality, bit-rate, cost, complexity, and any combination thereof);

a disparity compensation module (1410) which, given disparity parameters and previously reconstructed samples/information, is configured to generate a prediction for a present block or image;

forward and inverse transform (1415, 1430) and quantization (1420, 1425) modules, which are configured to encode any residual/error information that may remain after prediction;

a loop filter (1435) (also referred to as an in-loop filter), which is configured to perform additional processing/filtering after reconstruction of the data to reduce coding artifacts and improve subjective (primarily) and objective quality;

reference picture buffer (1440) memory, which is accessed and appropriately controlled for prediction purposes; and entropy coding modules (1445), which are configured to losslessly compress the various information involved in reconstructing the image data (including but not limited to disparity estimation information, transformed and quantized residual data, loop filtering control parameters, header information, etc.).

Figure 15:
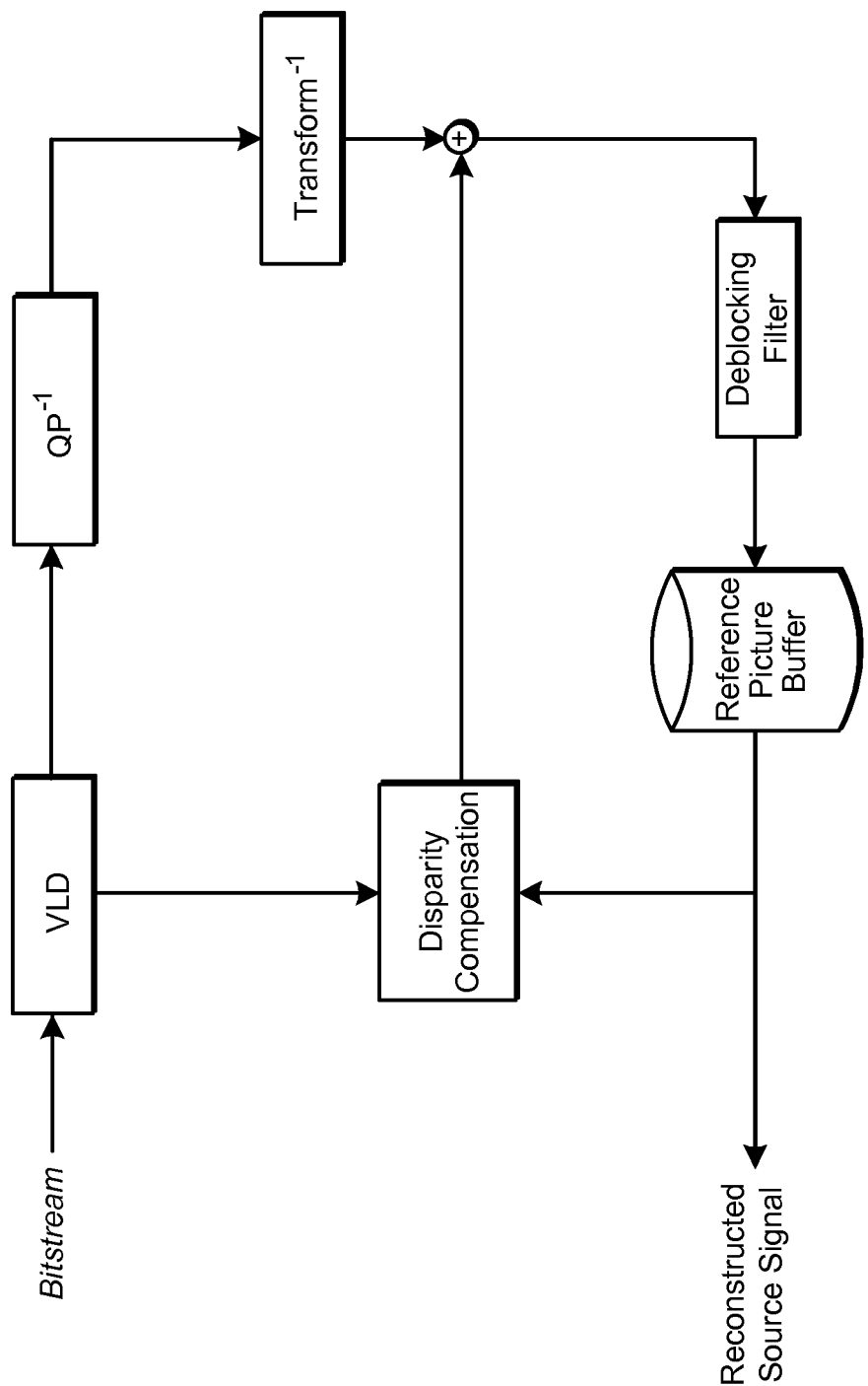
FIG. 15 depicts an example implementation of a video decoder that is adapted to decode information encoded with the video encoder of FIG. 14.

FIG. 15 depicts an example implementation of a video decoder that can be configured to decode information encoded with the video encoder of FIG. 14. The video decoder has similar components to those found in the video encoder of FIG. 14. The video decoder can comprise, for instance, an entropy decoding module, inverse transform and quantization components, a disparity compensation module, a loop filter, and reference buffer memory for prediction purposes. The video decoder can also, optionally, comprise a loop-filter.

In a first technique, encoding systems can directly encode an enhancement layer picture as an image. However, given possibly high correlation between original signal samples coded in a present layer (e.g., the enhancement layer) and corresponding original signal samples coded in a higher priority layer (e.g., base layer or higher priority enhancement layer), a second technique is to, optionally, process the decoded signal in the higher priority layer using an RPU to predict the original signal coded in the present layer (e.g., the enhancement layer), thus generating an inter-layer RPU reference, and subtract from the original signal the inter-layer RPU reference prior to encoding. Such a subtraction yields a residual signal, which after some pre-processing can then be encoded as an image.

Equivalently, at a decoder, a decoded residual signal can be added to an RPU reference in order to reconstruct an output picture. Such a technique for a multi-layer frame-compatible system is depicted in reference [6]. It should be noted again that use of the RPU is not required. For instance, an inter-layer reference used in the subtraction to yield the residual signal need not be processed with an RPU and need not be processed using any fixed processing/filtering.

An example method for pre-processing the residual signal such that it is suitable for being encoded as an image can be given as follows. Consider a codec that codes 8-bit content whereas the residual signal has a dynamic range of 9 bits (e.g., signed 9-bit integer). For reasons of economy or scale, the residual signal may be coded as 8-bit content, which can involve converting the signed 9-bit integer representation of the residual signal to an unsigned 8-bit integer. This can involve adding an offset (such that values are nonnegative) and either clipping or shifting at least one bit to bring dynamic range to 8 bits. It should be noted that, alternatively, a 9-bit encoder/decoder can be used to perform encoding/decoding on the residual signal, thus making scaling and clipping, which generally introduces additional distortion, unnecessary. However, even in the case of using a 9-bit encoder/decoder, an offset, for example, can still be applied to avoid nonnegative values. Any such offset information can generally be signaled to a decoder such that the offset can subsequently be removed at the decoder.

Figure 7:
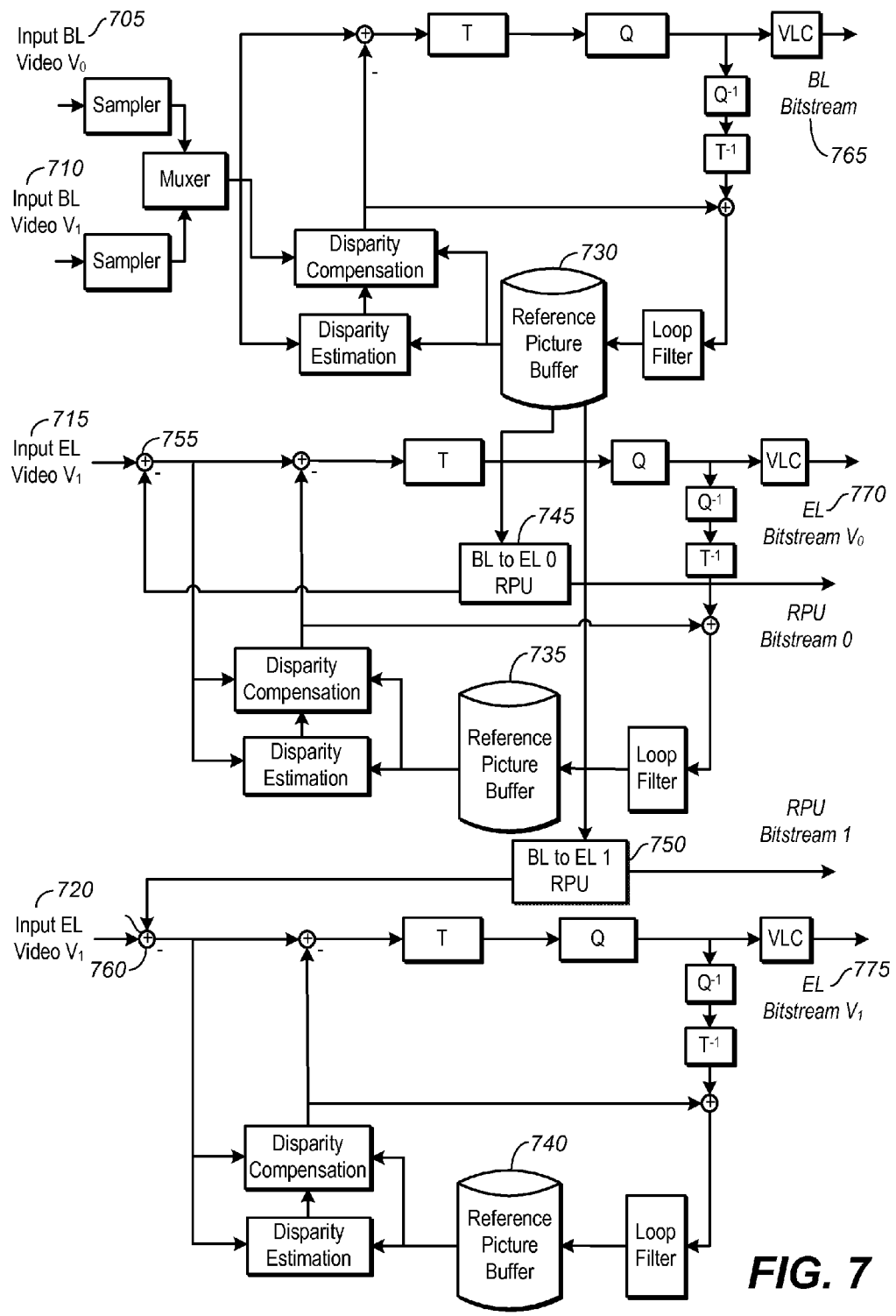
FIG. 7 depicts an example multi-layer scalable video encoder comprising a base layer and two enhancement layers, where each layer is associated with a corresponding encoder.
Figure 8:
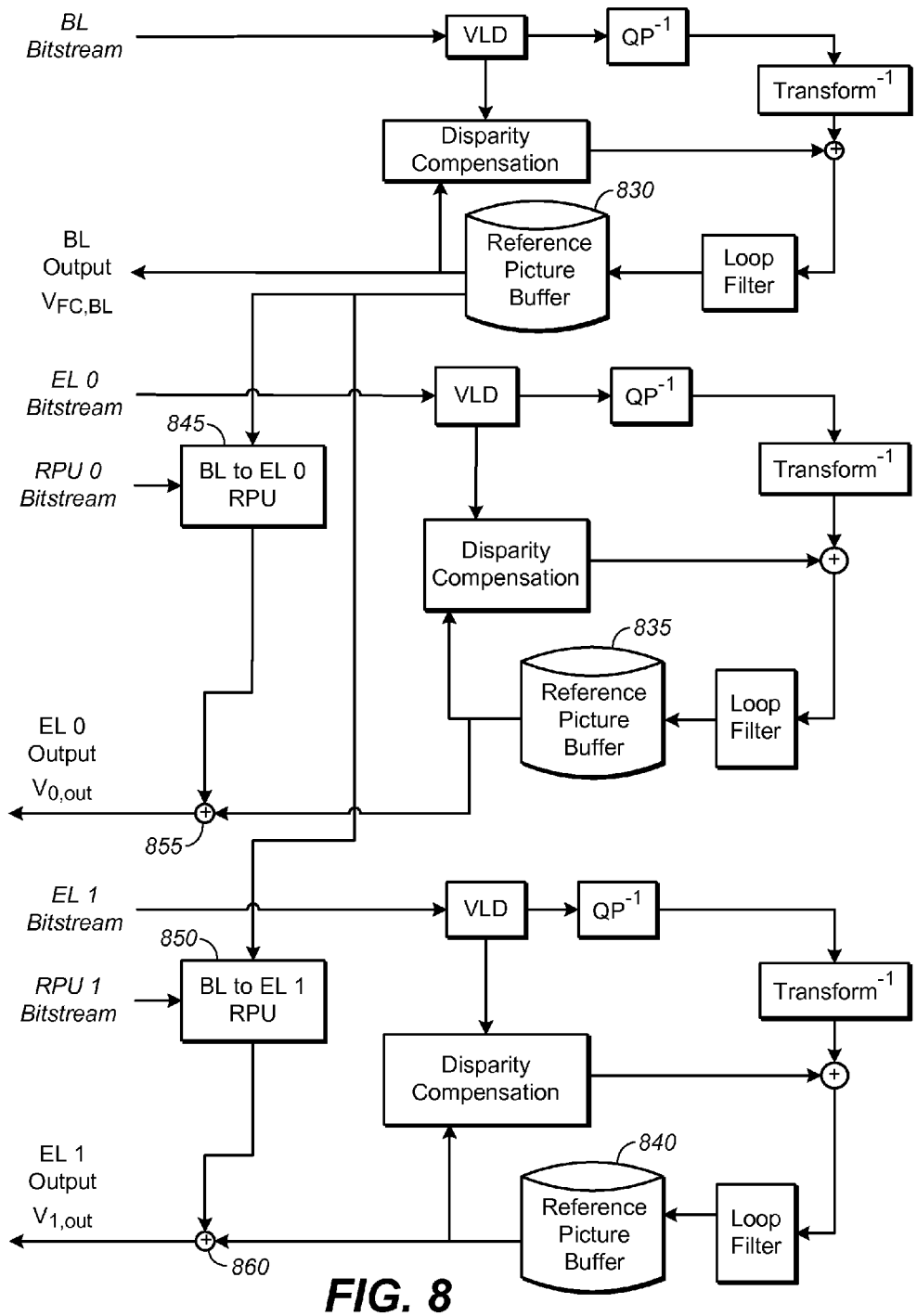
FIG. 8 depicts an example multi-layer scalable video decoder that can be used with the multi-layer scalable video encoder of FIG. 7.

Diagrams of an example encoder and decoder for the multi-layer frame-compatible system are depicted in FIG. 7 and FIG. 8.

FIG. 7 depicts an example multi-layer scalable video encoder comprising a base layer and two enhancement layers, each layer associated with an encoder. The base layer encoder can be the same as that depicted in FIG. 14. In FIG. 7, from base layer video input information (705, 710), the base layer encoder encodes frame-compatible pictures into a bitstream (765) to be sent to a base layer decoder (not depicted in FIG. 7) and reconstructs frame-compatible pictures adapted to be stored as reference pictures in a base layer reference picture buffer (730).

Inter-layer (base layer to corresponding enhancement layer) prediction pictures can be generated using corresponding RPUs (745, 750) for each of the enhancement layers. These inter-layer prediction pictures can be subtracted (755, 760) from original input signals at each layer (715, 720) and resulting residual signals can be coded. Enhancement layer reference picture buffers (735, 740) can contain residual information associated with previously coded frame-compatible pictures. The enhancement layer encoders can generate corresponding enhancement layer bitstreams (770, 775) that can comprise the residual signal information.

FIG. 8 depicts an example multi-layer scalable video decoder that can be used with the multi-layer scalable video encoder of FIG. 7. In each enhancement layer, a base layer to enhancement layer RPU (845, 850) can take as input decoded base layer pictures from a base layer reference picture buffer (830) and can process the decoded base layer pictures to generate RPU prediction pictures. The RPU prediction pictures can then be added (855, 860) to decoded residual information in each enhancement layer reference picture buffer (835, 840) to yield reconstructed pictures.

According to many embodiments of the present disclosure, a hybrid coding scheme for single-layer encoding/decoding systems and for enhancement layer (EL) coding applied in multi-layer video encoding/decoding systems is described. While coding is described with reference to multi-layer video encoding/decoding systems, teachings relating to multi-layer video encoding/decoding systems can be applied to single-layer encoding/decoding systems. A region in an enhancement layer may be coded in one of two available coding modes: a residual coding mode and a picture coding mode. The hybrid coding scheme at an enhancement layer encoder may adaptively switch between the residual coding mode and the picture coding mode. Selection of the coding mode is generally made on a region-by-region basis.

A signaling mechanism can signal the coding mode selected for a particular enhancement layer picture or region. By way of example and not of limitation, the signaling mechanism can be a flag or a coding mode syntax element, including setting coding parameters such as motion vectors, mode information, and/or reference indices in a codec such as H.264/AVC or HEVC. As an example, if a certain reference index, motion vector, or motion vector subpixel position is encountered, a signal A (e.g., representing picture coding mode) can be signaled to the decoder. Otherwise, a signal B (e.g., representing residual coding mode) can be signaled to the decoder. With these signals, information on the coding parameters (e.g., motion vectors, mode information, reference indices, etc.) can be set.

Coding mode information may be signaled at a region, macroblock, slice, picture, or sequence level. According to many embodiments of the present disclosure, coding mode decision can be adaptive at the region level, where a region can be a pixel or a block of pixels or an entire picture or frame.

When the residual coding mode is selected for and applied to a region in a present layer of a multi-layer codec system, a signal encoded by the encoder (or equivalently a signal decoded by the decoder) in the present layer represents a difference between an inter-layer prediction or reference and an original input picture in the present layer. For example, for 3D frame compatible delivery, the inter-layer prediction or reference can be (but need not be) generated using an RPU. It should be noted that the residual coding mode can be considered as employing a second-order prediction for the enhancement layer.

When the picture coding mode is selected for and applied to a region in a present layer, the signal to be encoded/decoded represents image information pertaining to the image itself (in contrast to a residual of the image) and the inter-layer reference or references can be used directly as an optional prediction reference or references, including all other, possibly available references (e.g., inter references).

Figure 3:
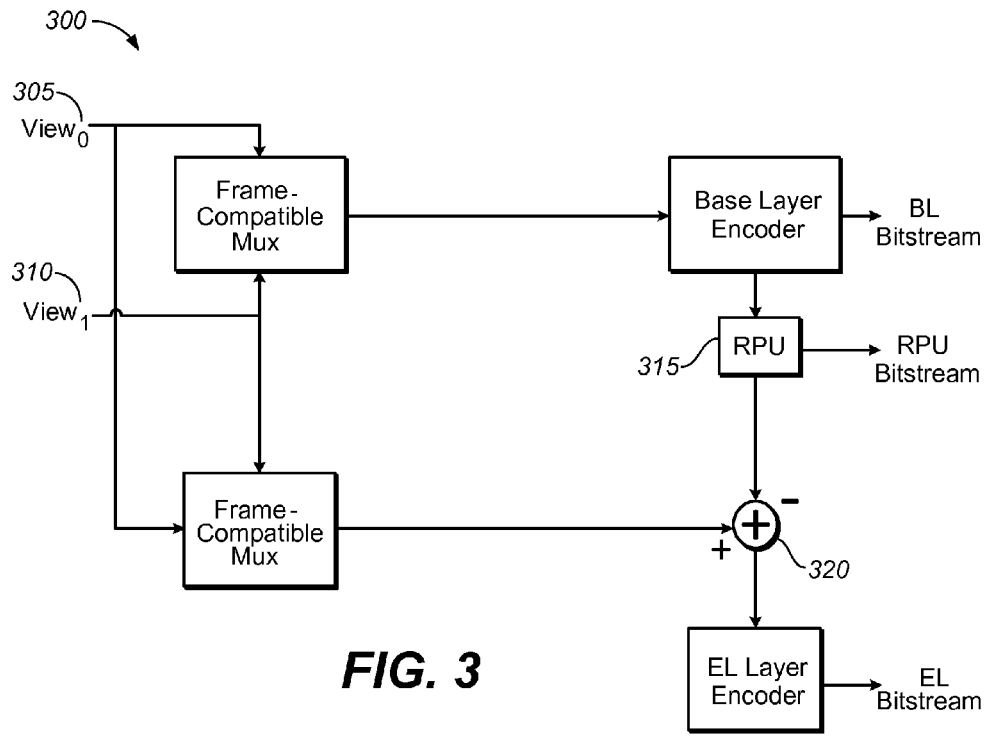
FIG. 3 depicts an example residual coding scheme.

FIG. 3 depicts an exemplary residual coding scheme. It should be noted that a frame-compatible 3D encoder is depicted only as an example, and that other encoders can also be used. A source signal can comprise a zeroth view (305) and a first view (310). An output from an RPU (315), which predicts the source signal (305, 310), can be subtracted (320) from the source signal (305, 310) to obtain a residual signal. The residual signal can be predicted using inter and intra prediction, to be described as follows.

In inter prediction, the residual signal may be predicted using motion estimation/compensation from previously decoded residual signals. Residual signals may also be generated, in the case that an image or region was encoded directly without residual prediction, by subtracting an RPU reference from a reconstructed picture after decoding. In intra prediction, the residual signal can be predicted based on neighboring residual causal samples. Causal samples refer to previously encoded or decoded samples, which are thus available to the present layer when the present samples/regions are being predicted.

The residual signal can be more difficult to predict compared to image samples since the residual signal may be characterized by noise, which can often be difficult to model. This noise can be further emphasized since subtracting of two images to generate a residual also generally adversely impact correlation that may have been present between the two images. In other words, generation of the residual signal can act as a spatial decorrelation step. In general, fast motion estimation methods are sensitive to noise and are thus, generally, adversely impacted by such spatial decorrelation.

Unlike coding a picture signal, where frequency content and overall quality generally does not vary significantly across subsequent frames, in the residual coding mode, the signal to be coded can be a function of samples that were processed (optionally) by an RPU and that were then subtracted from an original signal to form a residual signal. As previously noted, the samples can be subtracted from the original signal without first being processed by an RPU.

These samples (optionally processed by the RPU) contain quantization noise, which can contribute to noise present in the residual signal. Furthermore, this quantization noise varies across frames since hierarchical prediction structures and B-pictures may be used to code those frames, where each frame is usually allocated different quantization levels according to its type and position in the structure. In a hierarchical prediction structure, different references are of different importance, and the references that are considered more important are generally coded using quantization parameters associated with finer quantization (e.g., generally smaller quantization parameters), resulting in reconstructed/decoded pictures with less quantization noise than if coarser quantization were used.

Figure 11:
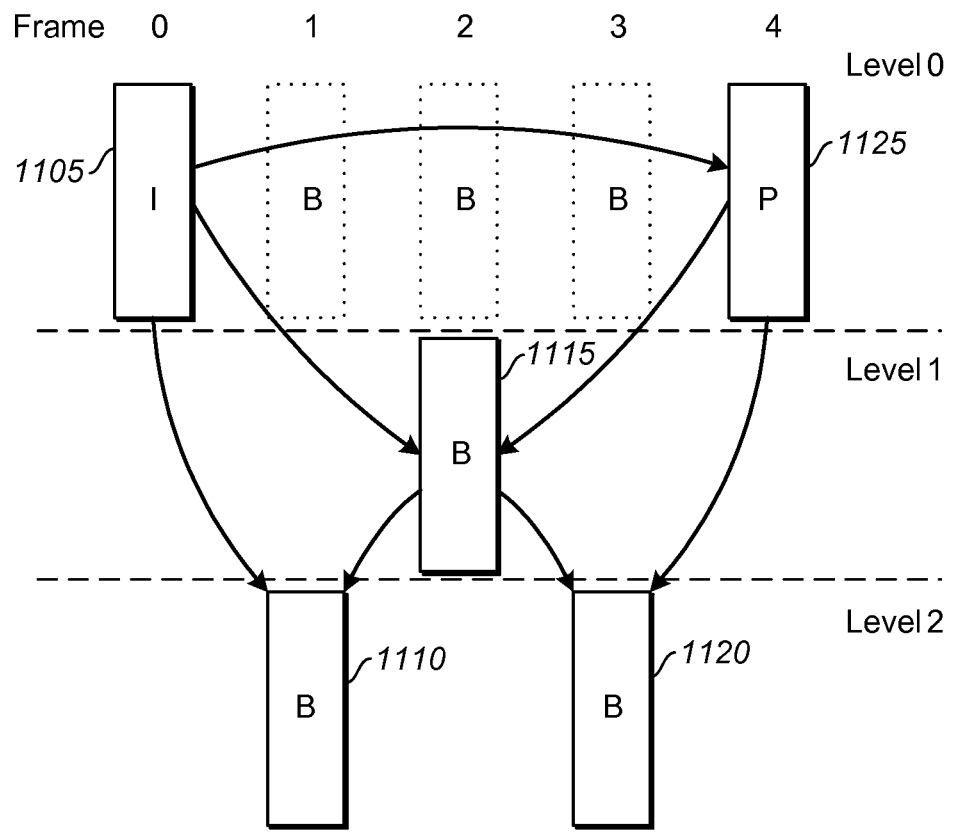
FIG. 11 depicts an example hierarchical prediction structure.

FIG. 11 depicts an example hierarchical prediction structure. Frames 0 (1105) and 4 (1125) are generally considered more important since they (1105, 1125) serve as references to frames 1 (1110), 2 (1115), and 3 (1120) and as such their (1105, 1125) quality is going to affect quality of the multiple frames (1110, 1115, 1120) for which they (1105, 1125) serve as references. As a result, frames 0 (1105) and 4 (1125) are generally coded with a finer quantization and/or coded at a higher quality compared to the remaining frames (1110, 1115, 1120). By way of example and not of limitation, higher quality coding can refer to finer quantization levels (e.g., lower quantization parameter values), adapting parameters during a rate-distortion optimization (e.g., lambda parameter in a Lagrangian cost calculation), and/or thresholding of quantized transform coefficients (e.g., through use of different adapted quantization matrices), among others.

With continued reference to FIG. 11, frame 2 (1115) is used as a reference for both frames 1 (1110) and 3 (1120). Consequently, frame 2 (1115) may be coded with a finer quantization and/or at a higher quality than frames 1 (1110) and 3 (1120). Frames 1 (1110) and 3 (1120) are generally considered least important (since they do not serve as references to any of the other frames) and thus coarser quantization can be adopted and/or lower quality can be coded since bits allocated on frames 1 (1110) and 3 (1120) only affect the respective frames (1110, 1120) and do not affect quality of subsequently coded frames.

Figure 4:
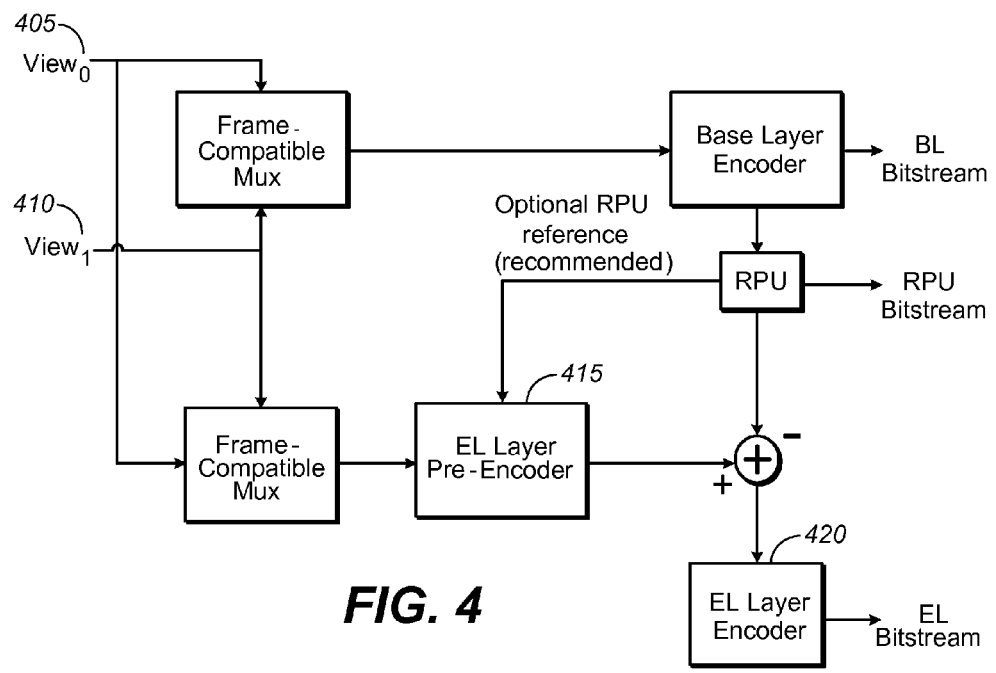
FIG. 4 depicts an example two pass encoding scheme for the residual coding mode.

FIG. 4 depicts a two pass encoding scheme for the residual coding mode (in contrast to FIG. 3, which depicts a single pass residual coding scheme). As in FIG. 3, it should be noted that a frame-compatible 3D encoder is depicted only as an example, and that other encoders can also be used. The two pass residual coding scheme can be used to address issues pertaining to noise (e.g., quantization noise, source signal noise, etc.). A source signal can comprise a zeroth view (405) and a first view (410).

In FIG. 4, an enhancement layer frame can be coded twice. A pre-EL encoder (415) can process the source signals (405, 410), and not a residual signal, and reconstruct the source signal (405, 410) by either implementing or simulating a full encoding process, such as that provided in FIG. 14. The pre-EL encoder (415) may adopt a smaller quantization parameter (i.e., finer quantization) than an EL encoder (420).

In the first pass, an image, which can be of higher quality than in the case for single pass EL encoding, can be reconstructed by the pre-EL encoder (415). This reconstructed image can then serve as a source signal in the second pass. Specifically, the reconstructed image can be fed into the EL encoder (420).

In one embodiment, one pass through the pre-EL encoder (415) and a second pass through the EL encoder (420) can be implemented. Other embodiments may implement more than two passes. The multiple passes can comprise at least one pre-EL encoder followed by at least one EL encoder. Additionally, multiple encoders can be connected in parallel to allow combination (linear or nonlinear) of signals.

In the pre-encoding process/passes, some high frequency components in the initial source signal (405, 410) and the subsequent source signals will be removed due to quantization. Consequently, the reconstructed image can be easier to predict and compress for the subsequent passes (since high frequency components are associated with abrupt changes in an image).

To reduce complexity, one fast method of implementing the first pass is to take into consideration only a subset of potential RPU filters or methods when selecting an RPU filter or method to be applied. Another fast method is to selectively apply two (or more) passes based on the picture coding type (e.g., I, P, or B picture).

An encoding system or scheme can switch between picture coding mode or residual coding mode at the enhancement layer for each picture or region by considering coding efficiency of these two modes. The coding mode may be signaled in an RPU data packet and/or a part of the slice or macroblock syntax of the enhancement layer. A decoding system or scheme can switch the decoding process between the residual decoding and picture decoding process according to the signaled coding mode.

Figure 2A:
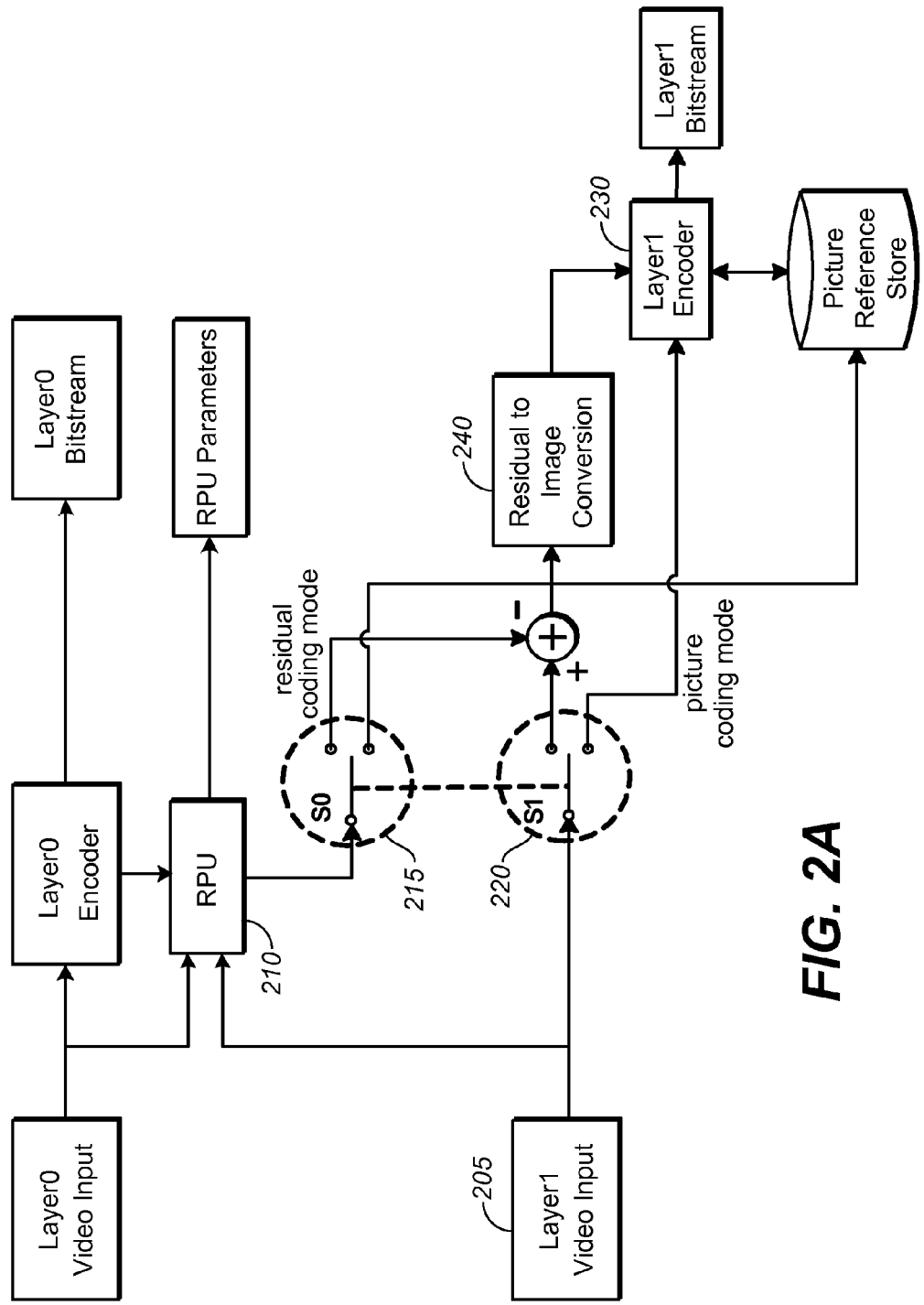
FIGS. 2A and 2B depict example hybrid encoding and decoding schemes, respectively, for a two layer codec system.
Figure 2B:
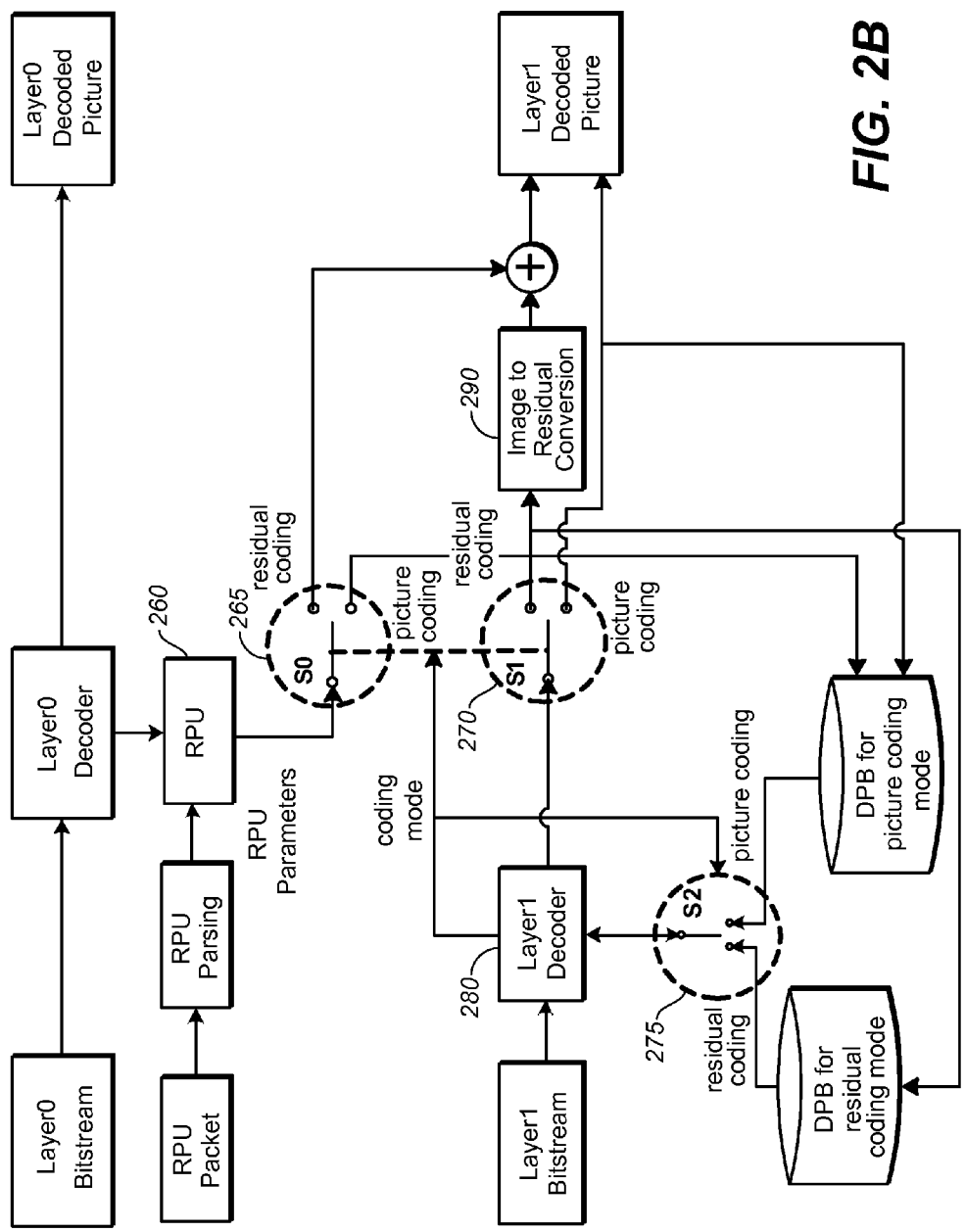

FIGS. 2A and 2B depict example hybrid encoding and decoding schemes, respectively, for a two layer codec system. The two layer codec can comprise an RPU (210 in FIG. 2A, 260 in FIG. 2B). Switches S0 (215 in FIG. 2A, 265 in FIG. 2B) and S1 (220 in FIG. 2A, 270 in FIG. 2B) can control whether a second layer (generally an enhancement layer) is coded using the residual coding mode or the picture coding mode. A prediction from the RPU (210 in FIG. 2A, 260 in FIG. 2B) can be stored into a reference picture buffer if the picture coding mode is selected. Otherwise, for the residual coding mode, the prediction from the RPU (210 in FIG. 2A, 260 in FIG. 2B) will be subtracted from a source input (205 in FIG. 2A), and a difference (residual) signal is appropriately offset and clipped (240 in FIG. 2A) to be coded in the enhancement layer.

The offsetting and clipping can be performed in a residual to image conversion module (240 in FIG. 2A, 290 in FIG. 2B). In some embodiments, at the encoder side, the residual to image conversion module (240 in FIG. 2A) can comprise adding an offset and then clipping (e.g., to a value between 0 and 255). At the decoder side, the residual to image conversion module (290 in FIG. 2B) can comprise subtracting the offset. In other embodiments, the encoder side residual to image conversion module (240 in FIG. 2A) can comprise adding an offset and shifting all bits to the right by one (e.g., for 9-bit to 8-bit conversion). The corresponding decoder side residual to image conversion module (290 in FIG. 2B) shifts all bits to the left by one and then subtracts the offset.

An enhancement layer decoder (280 in FIG. 2B) can process an enhancement layer bitstream from an enhancement encoder (230 in FIG. 2A) according to a mode signaled by the enhancement layer encoder (230 in FIG. 2A) and can consider the offset and clipping (240 in FIG. 2A, 290 in FIG. 2B) used to prepare the residual signal. Reference picture buffer to be used by the enhancement layer decoder (280 in FIG. 2B) can depend on a switch S2 (275 in FIG. 2B) associated with coding mode selection information. Selection (265, 270, 275 in FIG. 2B) between the picture coding modes and residual coding modes can be based on minimizing a Lagrangian cost defined below, which jointly considers distortion and rate, $$J(m)=D(m)+\lambda_r*r(m)$$

where m refers to either the residual coding mode or the picture coding mode, r(m) refers to a rate associated with m, D(m) refers to distortion associated with m, and J(m) refers to a cost associated with m.

Figure 16:
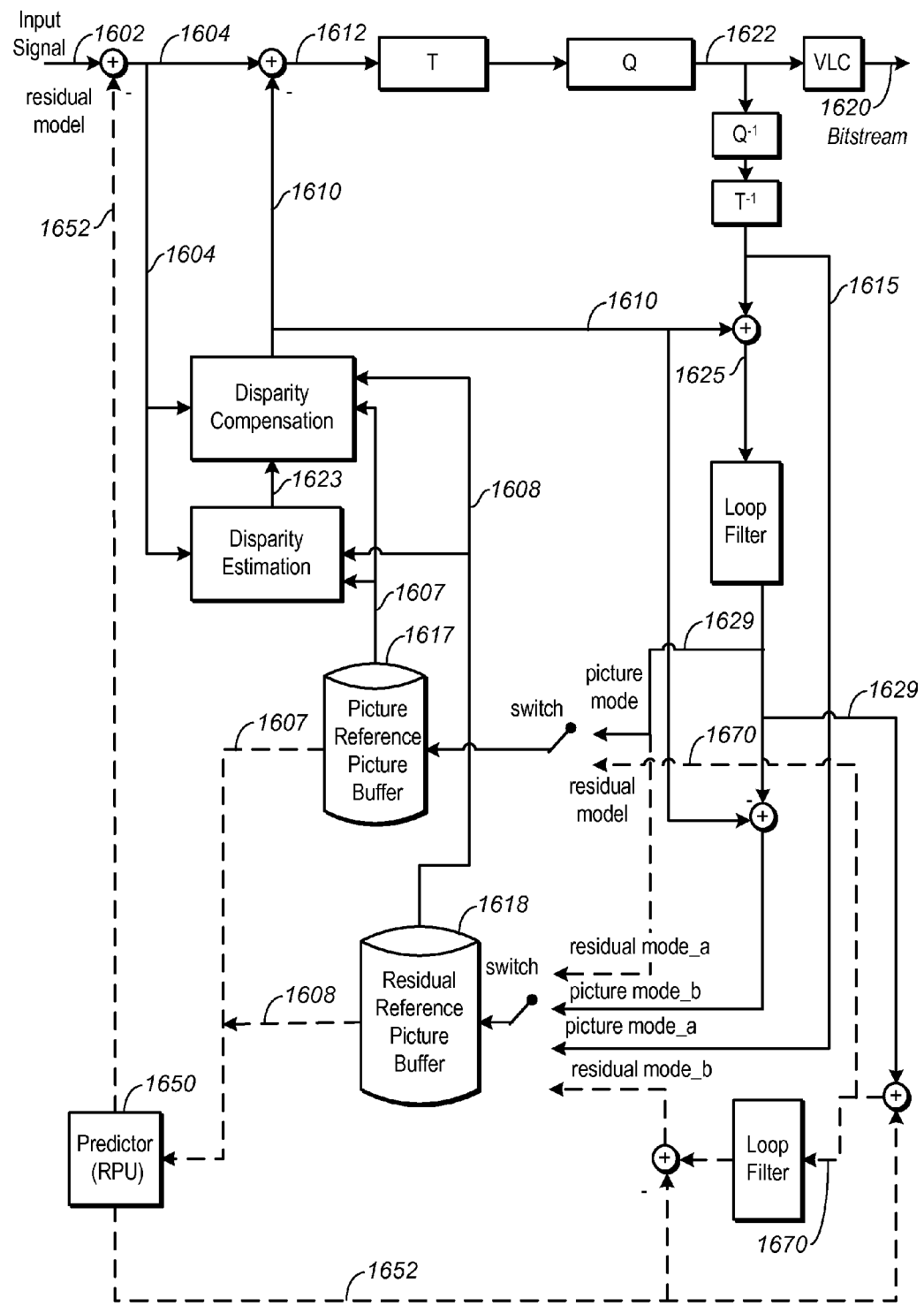
FIG. 16 depicts an example encoder that can be used for picture coding mode and residual coding mode.

FIG. 16 depicts an example encoder that can be used for picture coding mode and residual coding mode. The encoder is depicted as a single layer encoder, but may be applicable to multiple layer encoding. For multiple layer encoding, the encoder as depicted in FIG. 16 can be applied to a present layer and reference pictures from one or more reference picture buffers associated with higher priority layers can be utilized for coding the present layer.

The encoder depicted in FIG. 16 may be utilized to encode input or provided video image data by one or more methods. For example, in the case of residual mode coding, one such method for encoding video image data (1604) into a bitstream (1620) may comprise providing the video image data (1604) to the encoder, where the video image data (1604) can comprise pictures. Disparity estimation and/or disparity compensation can be performed based on (e.g., with consideration to information from) reference pictures (1607, 1608) from one or more reference picture buffers (1617, 1618) and the provided pictures in the video image data (1604) to provide disparity compensated-prediction (also referred to as codec-prediction) pictures (1610). A difference can be taken between the provided pictures and the codec-prediction pictures (1610) to generate residual information (1612). Transformation and quantization can then be applied to the residual information (1612) to obtain a quantized transform residual information (1622). Entropy encoding can be performed on the quantized transform residual information (1622) to generate the bitstream (1620).

It should be noted that disparity compensation may be performed without performing disparity estimation by, for example, fixing all motion vectors to (0, 0). The decoder, however, can be configured to perform disparity compensation without disparity estimation since estimated disparity parameters are generally signaled to the decoder in the bitstream (1620).

In the method of operation of the encoder of FIG. 16 in the residual coding mode, as described earlier, one may utilize residual type reference pictures (1608) (also referred to as reference pictures of residual information) from a residual type reference picture buffer (1618) when performing disparity estimation and/or disparity compensation to generate the codec-prediction pictures (1610). The residual type reference picture buffer (1618) is a reference picture buffer that contains residual type reference pictures (1608). The video image data (1604) can be generated from an input video signal (1602) by generating reconstructed reference pictures based on residual type reference pictures (1608) from a residual type reference picture buffer (1618); deriving a reference processing unit-prediction (rpu-prediction) picture (1652) based on the reconstructed reference pictures; and taking a difference between the input video signal (1602) and the rpu-prediction pictures (1652). The video image data (1604) is the difference between the input video signal (1602) and the rpu-prediction pictures (1652). As previously provided in the method of operation of the encoder of FIG. 16 in the residual coding mode, a difference (1612) can then be obtained between this video image data (1604) and the codec-prediction pictures (1610), where the difference (1612) can then be transformed, quantized, and entropy encoded to generate the bitstream (1620).

In the method of operation of the encoder of FIG. 16 in the residual coding mode, as described earlier, one may utilize picture type reference pictures (1607) (also referred to as reference pictures of picture information) from a picture type reference picture buffer (1617) when performing disparity estimation and disparity compensation to generate the codec-prediction pictures (1610). Residual type reference pictures (1608) can be generated from the picture type reference pictures (1607) by taking a difference between the picture type reference pictures (1607) and previously generated reference processing unit-prediction (rpu-prediction) pictures (1652) corresponding to the picture type reference pictures (1607). The video image data (1604) can be generated from an input video signal (1602) by generating reconstructed reference pictures based on the generated residual type reference pictures; deriving reference processing unit-prediction (rpu-prediction) pictures (1652) based on the reconstructed reference pictures, including picture type reference pictures (1607) and residual type reference pictures (1608); and taking a difference between the input video signal (1602) and the derived rpu-prediction pictures (1652). As previously provided in the method of operation of the encoder of FIG. 16 in the residual coding mode, a difference (1612) can then be obtained between this video image data (1604) and the codec-prediction pictures (1610), where the difference (1612) can then be transformed, quantized, and entropy encoded into the bitstream (1620).

In the case of picture mode coding, a method of operation of the encoder of FIG. 16 for encoding video image data (1604) into a bitstream (1620) by utilizing residual type reference pictures (1608) from a residual type reference picture buffer (1608) is provided. Picture type reference pictures (1607) can be generated from the residual type reference pictures (1608) by computing a sum between the residual type references pictures (1608) with previously generated reference processing unit-prediction (rpu-prediction) pictures (1652) corresponding to the residual type reference pictures (1608). The method for encoding may comprise performing disparity estimation and/or disparity compensation based on reconstructed reference pictures generated from the generated picture type reference pictures (1607) and input pictures of the video image data (1604) to provide codec-prediction pictures (1610); taking a difference between the input pictures of the video image data (1604) and the codec-prediction pictures (1610) to provide a first set of residual information (1612); performing transformation and quantization on the first set of residual information (1612) to obtain a processed first set of residual information (1622); and performing entropy encoding on the processed first set of residual information (1622) to generate the bitstream (1620).

Figure 17:
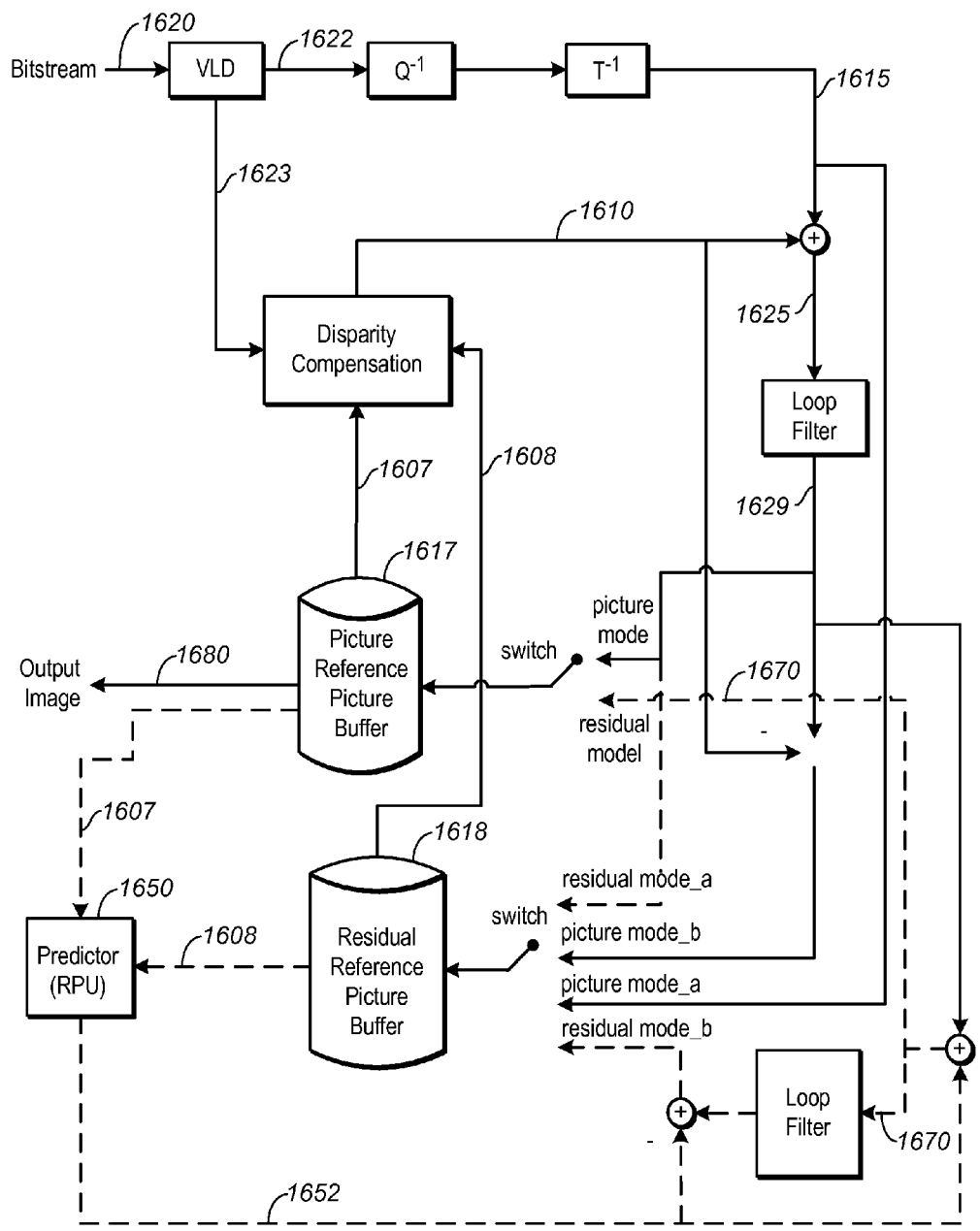
FIG. 17 depicts an example decoder associated with the encoder of FIG. 16.

FIG. 17 depicts an example decoder for decoding bitstream (1620) coded with the encoder of FIG. 16. The decoder depicted in FIG. 17 may be utilized to decode a bitstream (1620) of encoded image data of picture information and utilize residual type reference pictures (1608) to generate output images (1680). Such a decoding method may comprise providing the bitstream (1620) (e.g., receiving at the decoder, a bitstream from an encoder), where the bitstream (1620) comprises encoded image data of picture information; performing entropy decoding on the bitstream (1620) to obtain a processed first set of residual information (1622); performing inverse quantization and inverse transformation on the processed first set of residual information (1622) to obtain a second set of residual information (1615); performing disparity compensation based on reconstructed reference pictures of picture information generated from residual type reference pictures (1608) from a residual type reference picture buffer (1618) and the processed first set of residual information (1622) to obtain disparity compensated-prediction (codec-prediction) pictures (1610); and combining the codec-prediction pictures (1610) and the second set of residual information (1615) to obtain reconstructed images (1625), where the output images (1680) are based on the reconstructed images (1625). The reconstructed reference pictures of picture information, which are picture type reference pictures (1607) associated with the residual type reference pictures, can be generated from the residual type reference pictures (1608) by computing a sum between the residual type references pictures (1608) with previously generated reference processing unit-prediction (rpu-prediction) pictures (1652) corresponding to the residual type reference pictures (1608). The reconstructed images (1625) in picture coding mode or the reconstructed images (1670) in residual coding mode can be stored in a picture type reference picture buffer (1617) for use as picture type reference pictures in subsequent coding processes.

It is noted that in this method of operation of the encoder and decoder in the picture mode, two types of residual reference pictures can be generated and stored in the residual type reference picture buffer (1618). The first type of residual reference pictures, which is indicated by "picture mode_a" in FIG. 16 and FIG. 17, can be based on (e.g., can be a function of) the second set of residual information (1615). The second type of residual reference picture, which is indicated by "picture mode_b" in FIG. 16 and FIG. 17, can be generated by filtering the reconstructed images (1625) with a loop filter (e.g., a deblocking filter) and taking a difference between the filtered reconstructed images and the codec-prediction pictures (1610) to generate residual type reference pictures (1608) that can be stored (or adapted to be stored) in a residual type reference picture buffer (1618). The output images (1680) can be based on these filtered reconstructed images (1629).

The decoder depicted in FIG. 17 may also be utilized to decode a bitstream (1620) of coded residual information to generate output images (1680). The decoder may be utilized to decode a bitstream (1620) of encoded image data of residual information. Such a method may comprise performing entropy decoding on the bitstream (1620) to obtain a processed first set of residual information (1622) and signaled disparity (e.g., motion and mode) information (1623) from an encoder; performing inverse quantization and inverse transformation on the processed first set of residual information (1622) to obtain a second set of residual information (1615); performing disparity compensation based on reference pictures from reference picture buffer or buffers and the signaled disparity information (1623) to obtain disparity compensated-prediction (codec-prediction) pictures (1610); combining the codec-prediction pictures (1610) and the second set of residual information (1615) to obtain codec-based reconstructed images (1625); and combining the codec-based reconstructed images (1625) and reference processing unit-prediction (rpu-prediction) pictures (1652) to generate reference processing unit-based (rpu-based) reconstructed images (1670), where the output images (1680) are based on the rpu-based reconstructed images (1670). The rpu-based reconstructed images (1670) can be stored (or adapted to be stored) in a picture type reference picture buffer (1617) for use as picture type reference pictures in subsequent coding processes. In some cases, the reconstructed images (1625) are the output images (1680).

It is noted that in this method of operation of the encoder and decoder in the residual mode, two types of residual reference pictures can be generated and stored in the residual type reference picture buffer (1618). The first type of residual reference pictures (1629), which is indicated by "residual mode_a" in FIG. 16 and FIG. 17, can be generated by loop filtering (e.g., deblocking) the codec-based reconstructed images (1625). The second type of residual reference picture, which is indicated by "residual mode_b" in FIG. 16 and FIG. 17, can be based on filtering the rpu-based reconstructed images (1670) with a loop filter and subtracting the rpu-prediction pictures (1652) from the loop filtered rpu-based reconstructed images to generate a residual type reference picture (1608) that can be stored (or adapted to be stored) in a residual type reference picture buffer (1618). The output images (1680) can be based on these filtered rpu-based reconstructed images (1629).

In one or more embodiments, the method of operation of the encoder of FIG. 16 and decoder of FIG. 17 in picture coding mode may comprise utilizing rpu-prediction pictures (1652) derived based on picture type reference pictures (1607) and performing disparity compensation based on disparity parameters determined (at the encoder) or signaled (to the decoder) motion/mode information (1623) and picture type reference pictures (1607) to obtain the codec-prediction pictures (1610). Similarly, operation of the encoder and decoder in residual coding mode may comprise utilizing the rpu-prediction pictures (1652) derived from reconstructed reference pictures based on residual type reference pictures (1608) and performing disparity compensation based on disparity parameters determined (at the encoder) or signaled (to the decoder) motion/mode information (1623) and residual type reference pictures (1608) to obtain the codec-prediction pictures (1610).

Further, in an embodiment of the present disclosure, as shown in both FIGS. 16 and 17, a method or system for generating a new reference picture (1617, 1618) of residual information and/or picture information is described. The method may comprise providing video image data (1604) to the system based on an input video signal; performing disparity estimation and/or disparity compensation based on reference pictures (1607, 1608) from one or more reference picture buffers (1617, 1618) and pictures of the video image data (1604) to provide disparity compensated-prediction (codec-prediction) pictures (1610), where the reference pictures (1607, 1608) can comprise residual information or picture information (or equivalently, where the reference pictures (1607, 1608) can be picture type or residual type); taking a difference between the pictures of the video image data (1604) and the codec-prediction pictures (1610) to provide a first set of residual information (1612); performing transformation and quantization on the first set of residual information (1612) to obtain a processed first set of residual information (1622); performing inverse quantization and inverse transformation on the processed first set of residual information (1622) to obtain a second set of residual information; and generating the new reference picture (1607, 1608) of residual information and/or picture information based on the codec-prediction pictures (1610) and the second set of residual information (1615). The new reference picture can be stored (or adapted to be stored) in one or more reference picture buffers (1617, 1618) for subsequent processes (e.g., subsequent coding processes).

It is noted the video image data (1604) provided to the encoder and decoder may be different depending on whether the encoder and decoder are operating in residual coding mode or picture coding mode. For example, when the encoder is operating in picture coding mode, the video image data (1604) is the input video signal (1602), whereas in residual coding mode the video image data (1604) is a difference between the input video signal (1602) and the rpu-prediction images (1652).

It is further noted that the method of generating new reference pictures (1617, 1618) as shown in FIGS. 16 and 17 may comprise variations. For example, in picture coding mode operation, the pictures of the video image data (1604) and the codec-prediction pictures (1610) can comprise picture information. The generating of a new picture type reference picture (1629) in the picture coding mode may comprise loop filtering a reconstructed image (1625) generated by a sum of at least one of the codec-prediction pictures (1610) and the second set of residual information (1615). The new reference picture (1629) of picture information (also referred to as the new picture type reference picture (1629)) can be stored in a picture type reference picture buffer (1617).

In addition, two types of residual type reference pictures may be generated. The first type of new residual type reference picture, which is indicated by "picture mode_a", can comprise the second set of residual information (1615). The second type of new residual type reference picture, which is indicated by "picture mode_b" can be generated by loop filtering a reconstructed image (1625) generated by a sum of at least one of the codec-prediction pictures (1610) and the second set of residual information (1615) and taking a difference between the loop filtered reconstructed image and the codec-prediction pictures (1610) to generate the new reference picture. For both types of residual type reference pictures, the new reference picture can be stored in a residual type reference picture buffer (1618).

Another variation in the method of generating new reference pictures (1617, 1618) as depicted in FIGS. 16 and 17 can be shown, as another example, in residual coding mode operation, where the pictures of the video image data (1604) and codec-prediction pictures (1610) can comprise residual information. In residual coding mode operation, the generating of a new picture type reference picture may comprise loop filtering a reconstructed image (1625) generated by a sum of at least one of the codec-prediction pictures (1610) and the second set of residual information (1615) and summing the loop filtered reconstructed image (1629) with a reference processing unit-prediction (rpu-prediction) picture (1652) based on a reference picture to generate the new picture type reference picture. The new picture type reference picture can be stored (or adapted to be stored) in a picture type reference picture buffer (1617).

It should be noted that, in the generating of new reference picture of picture information, the sum of at least one of the codec-prediction pictures (1610) and the second set of residual information (1615) (which is a residual of a residual) is then summed again with an rpu-prediction picture (1652) to obtain picture information. The two sets of prediction pictures, the codec-prediction pictures (1610) and the rpu-prediction pictures (1652), need not be based on the same reference picture. In fact, each prediction picture may comprise blocks drawn from multiple reference pictures. This applies both to the codec-prediction pictures (1610) as well as the rpu-prediction pictures (1652).

In addition, two types of residual type reference pictures may be generated. The first type of new residual type reference picture, which is indicated by "residual mode_a", may be generated by loop filtering a reconstructed image (1625) generated by a sum of at least one of the codec-prediction pictures (1610) and the second set of residual information (1615). The second type of new residual type reference picture, which is indicated by "residual mode_b", may be generated by performing the steps of i) loop filtering a sum (1625) of at least one of the codec-prediction pictures (1610) and the second set of residual information (1615), ii) summing the loop filtered sum (1629) of step i) with a reference processing unit prediction (rpu-prediction) picture (1652) based on a reference picture, iii) loop filtering the sum (1670) of step ii), and iv) subtracting the rpu-prediction picture (1652) from the loop filtered sum from step iii). In both cases, the new residual type reference picture can be stored in a residual type reference picture buffer (1618).

Adaptive switching between residual coding and picture coding for single layer coding or multiple layer coding may involve additional considerations. For adaptive switching, there may be a first set of cases where a present picture is coded in the residual coding mode whereas inter prediction can be referencing a reference picture that has been coded in the picture coding mode. In a second set of cases, a present picture may be coded in the picture coding mode whereas inter prediction can be referencing a reference picture that has been coded in the residual coding mode. For both cases, it may be useful to store in the reference picture buffer both versions of the reference picture, a picture coding mode version and its corresponding residual coding mode version.

In the first set of cases where the reference picture was coded in the picture coding mode, two example methods are provided below for generating the residual coding mode version of the reference picture for storing in the reference picture buffer:

(a) The residual coding mode version of the reference picture adapted to be stored can be the coded residual of the stored picture. This method can be also expressed as residual_buffer_a=residual.

(b) The residual coding mode version of the reference picture adapted to be stored can alternatively be the final stored picture minus its prediction. This prediction refers to the disparity compensated picture that was used to predict the present picture during decoding. This method can be also expressed as residual_buffer_b=deblock(residual+codec-prediction)−codec-prediction.

For both methods (a) and (b) of the first set of cases, the stored picture coding mode version of the reference picture can be expressed as deblock(residual+codec-prediction)=final_image.

In the second set of cases where the reference picture was coded in the residual coding mode, two example methods are provided below for generating the residual coding mode version of the reference picture for storing in the reference picture buffer:

(a) The residual coding mode version of the reference picture to be stored can be the final residual image. This method can also be expressed as residual_buffer_a=final_residual_image.

(b) The residual coding mode version of the reference picture to be stored can alternatively be residual_buffer_b=deblock(rpu-prediction+final_residual_image)−rpu-prediction, where rpu-prediction may be generated by a reference processing unit (RPU).

In both methods (a) and (b) of the second set of cases, the picture mode version of the reference picture to be stored can be expressed as deblock(rpu-prediction+final_residual_image).

The prediction generated by the RPU, referred to as rpu-prediction, may denote first order prediction, while the disparity compensated picture that was used to predict the present picture, referred to as codec-prediction, may denote second order prediction or first order prediction. For example, referring to FIG. 16, if the encoder operates in picture coding mode then codec-prediction (1610) is a first order prediction. However, if residual mode coding is used, then rpu-prediction (1650) represents the first order prediction and codec-prediction (1610) represents a second order prediction.

Within the core encoder, rpu-prediction is the prediction signal that can be used to generate the input residual. One example of the rpu-prediction can be based on a previous decoded picture (its picture coding mode version). The rpu-prediction can be subtracted from the present input picture in order to get the input residual signal. The rpu-prediction or rpu-prediction picture is generally a picture mode picture and can also include motion compensation, global motion compensation, and so forth.

FIG. 5 depicts an exemplary flowchart of adaptive encoding at an enhancement layer. In a first step (S505), base layer pictures or regions thereof can be encoded and reconstructed, where the reconstructed base layer pictures are adapted to be stored in a reference picture buffer. In a second step (S510), inter-layer references for prediction of the enhancement layer can be generated based on the reconstructed base layer pictures. An RPU can be used to generate inter-layer references that better predict the input signal coded in an enhancement layer.

In a third step (S515), picture coding mode is performed, where inter-layer prediction may benefit from an RPU that processes base layer (or some higher priority enhancement layer) samples to estimate a better prediction of the enhancement layer input signal. In a fourth step (S520), residual coding mode is performed. In the residual coding mode, a prediction of the enhancement layer input signal from samples of the base layer (or some higher priority enhancement layer), which may be the RPU inter-layer reference generated from the previous step (S510), can be subtracted from an original signal to obtain residual signals. The enhancement decoder can decode the residual signal and then add to the residual signal the inter-layer prediction (optionally an RPU inter-layer reference). It should be noted that the third and fourth steps (S515, S520) can be performed in any order.

In a fifth step (S525), a selection of the picture coding mode or the residual coding mode is performed. The selection can be based, for example, by minimizing some cost (e.g., the Lagrangian cost for optimization of rate-distortion performance of a video coding system). In general, a metric can consider a combination of the rate and the distortion usage (as in the Lagrangian method), complexity (at the encoder and/or decoder) of coding methods, or even power usage associated with such methods. Information pertaining to the selected coding mode can then be encoded and adapted to be signaled to the decoder.

FIG. 6 depicts another exemplary flowchart of adaptive encoding at an enhancement layer. Specifically, the picture coding mode can be performed first (S630) followed by the residual coding mode (S635). Such multi-pass encoding is shown, for instance, in FIG. 4. Costs (e.g., Lagrangian costs) associated with the two-pass encoding (S630, S635) can be calculated. The best mode can be selected (S625) based on performing only the picture coding mode (S615), only the residual coding mode (S620), and both the picture coding mode and residual coding mode (S630, S635). Although FIG. 6 shows two encoding passes, it should be noted that additional encoding passes may be performed and an associated cost (e.g., Lagrangian cost) calculated in order to select the best coding mode.

The codec shown in FIGS. 2A and 2B can further comprise in-loop filtering/deblocking for removing artifacts along boundaries of regions. The in-loop filtering/deblocking can, for example, be applied to an image or residual signal directly through signaling. The in-loop filtering/deblocking can be applied, alternatively or in conjunction, on a reconstructed signal. Adjacent regions that correspond to different coding methods (e.g., a residual coded region is adjacent to a picture coded region) may utilize different filtering from partitions that use the same coding methods. In general, discontinuities (and thus distortion) along boundaries of regions is generally higher when the regions correspond to different encoding methods. In such a case, the in-loop filtering/deblocking can generally be stronger in order to remove artifacts at region boundaries resulting from coding of the regions. Deblocking parameters utilized in an encoder can be signaled to a decoder. The signaling can comprise adjusting filter strength.

For the cases where boundaries along the regions correspond to the same coding method, filtering strength can also be adapted according to the coding method. In one such embodiment, weaker filtering can be applied when regions are processed with residual coding compared to regions processed with picture coding. Such processing (e.g., deblocking) can be performed similar to techniques already used for existing codecs such as AVC, where two regions may have different reference indices or motion vectors.

In an additional embodiment, the coding mode can be signaled to a decoder as part of an intra prediction mode. The decoder can thus be instructed whether to predict present samples of a region in the residual coding mode or the picture coding mode. Assume for example that a present region has already been signaled to the decoder as being coded in the residual coding mode. Intra prediction for the present region (e.g., block, picture/frame, sequence, etc.) can be used to predict residual samples for the present region using methods analogous to the residual coding mode and the picture coding mode.

In the residual coding mode, the present residual samples can be predicted from neighboring, already decoded, residual samples. In the picture coding mode, the following is performed: neighboring residual samples are added to an RPU prediction to get a picture-level representation of the neighboring residual samples, intra prediction is applied on these neighboring residual samples to predict present original signal samples, and then the RPU prediction is subtracted from these predicted picture samples of the present original signal to yield intra-predicted residual samples adapted to be used for decoding. Use of either the residual coding mode or the picture coding mode (or both) can be signaled to a decoder as intra prediction mode signals.

Furthermore, in some embodiments, samples generated using the picture coding mode can be predicted from other samples previously coded using the picture coding mode. In some cases, the samples can be predicted in the residual domain. In such an embodiment, one subtracts the RPU prediction from the previously coded/decoded neighboring samples to obtain new residual neighboring samples, intra prediction is applied on these new residual neighboring samples, and the predicted residuals are added to the RPU prediction of a present region to yield predictions of the present picture coding mode samples.

Note that such a hybrid scheme will result in coding of certain regions (e.g., blocks, pictures/frames, sequences, etc.) in the picture coding mode and other regions in the residual coding mode. For inter prediction, however, inter predicted references are generally of the same coding mode as that of a present region that is being coded to be reliable predictors.

In an embodiment, a reference picture buffer stores two sets of information of any present region or picture. One set of information contains the present region in the picture coded mode, which is generally a region ready to be displayed. Another set of information contains the present region in the residual coded mode. As the present region is coded, depending on its mode, the present region references the appropriate set of information (picture coded mode or residual coded mode) for inter prediction. Prior to storing the picture in the reference picture buffer, the coding mode can be checked. If the picture was coded in the picture coding mode, then, before storing the picture, a subtraction is performed between the picture and the prediction (which can be optionally derived with an RPU) to obtain its residual coding mode counterpart. Both the picture coded in the picture coding mode and its residual coding mode counterpart is stored in the reference picture buffer. Similarly, if the picture was coded in the residual coding mode, then, prior to storing the picture in the reference picture buffer, the picture can be added to the prediction to obtain its picture coding mode counterpart, and then both are stored in the reference picture buffer.

In another embodiment, a reference picture buffer keeps one set of information for any present region and regenerates the other set on demand when such information is requested (e.g., for inter prediction). Similar to many other embodiments of the present disclosure, generation of the information may be at a local level (e.g., involving individual pixels or groups of pixels in a picture) or at a picture level. For instance, an entire picture or frame can be regenerated and, optionally, placed in the reference picture buffer or some temporary storage for use in inter prediction. Alternatively, the regeneration of image information can be performed locally following a request to access a certain part of the picture or frame that contains certain motion information (e.g., motion vectors) and/or access a certain part that is situated at a certain set of coordinates.

In particular, if the residuals are stored (residual coding mode) in the reference picture buffers, then if a present region is to be coded in the picture coding mode, the stored region comprising the residuals has to be added (and optionally offset) to an RPU prediction corresponding to the stored region prior to being used as an inter prediction reference. Similarly, if the pictures are stored (picture coding mode) in the reference picture buffer and a present picture is to be coded in the residual coding mode, the stored region comprising the pictures will be processed by subtracting from the stored region a corresponding RPU prediction prior to being used as an inter prediction reference.

According to many embodiments of the present disclosure, hybrid encoding and decoding methods can be used in coding enhancement layers for a multi-layered codec, where an encoder can select the residual coding mode or the picture coding mode adaptively. A two-pass residual coding scheme can be utilized to reduce some high frequency components, which generally involve abrupt changes and/or discontinuities in image information and are thus generally more difficult to code than low frequency components. Quality and coding efficiency can be affected through use of such hybrid encoding and decoding methods.

Figure 9:
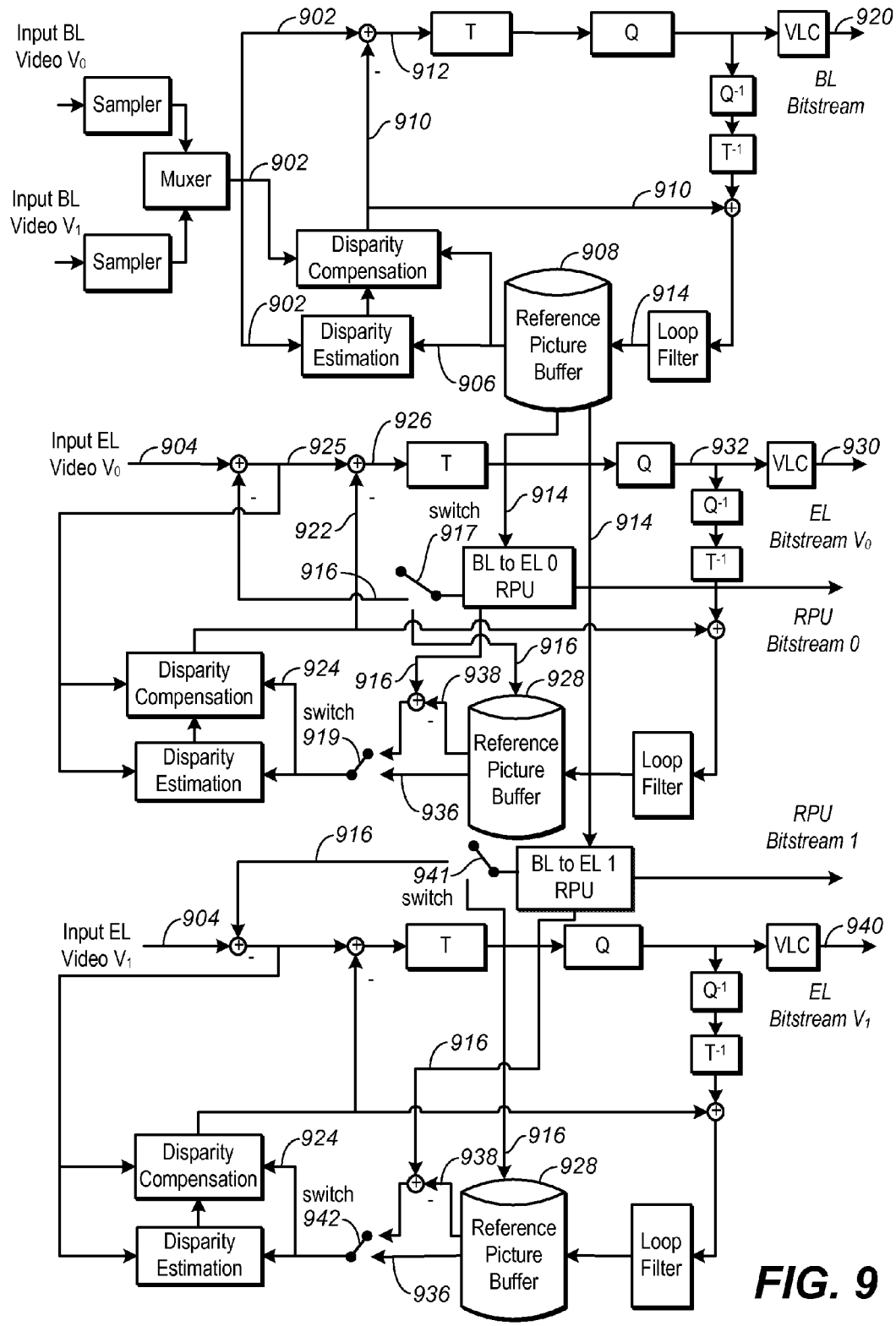
FIG. 9 depicts another example multi-layer scalable video encoder comprising a base layer and two enhancement layers, where each layer is associated with an encoder.
Figure 10:
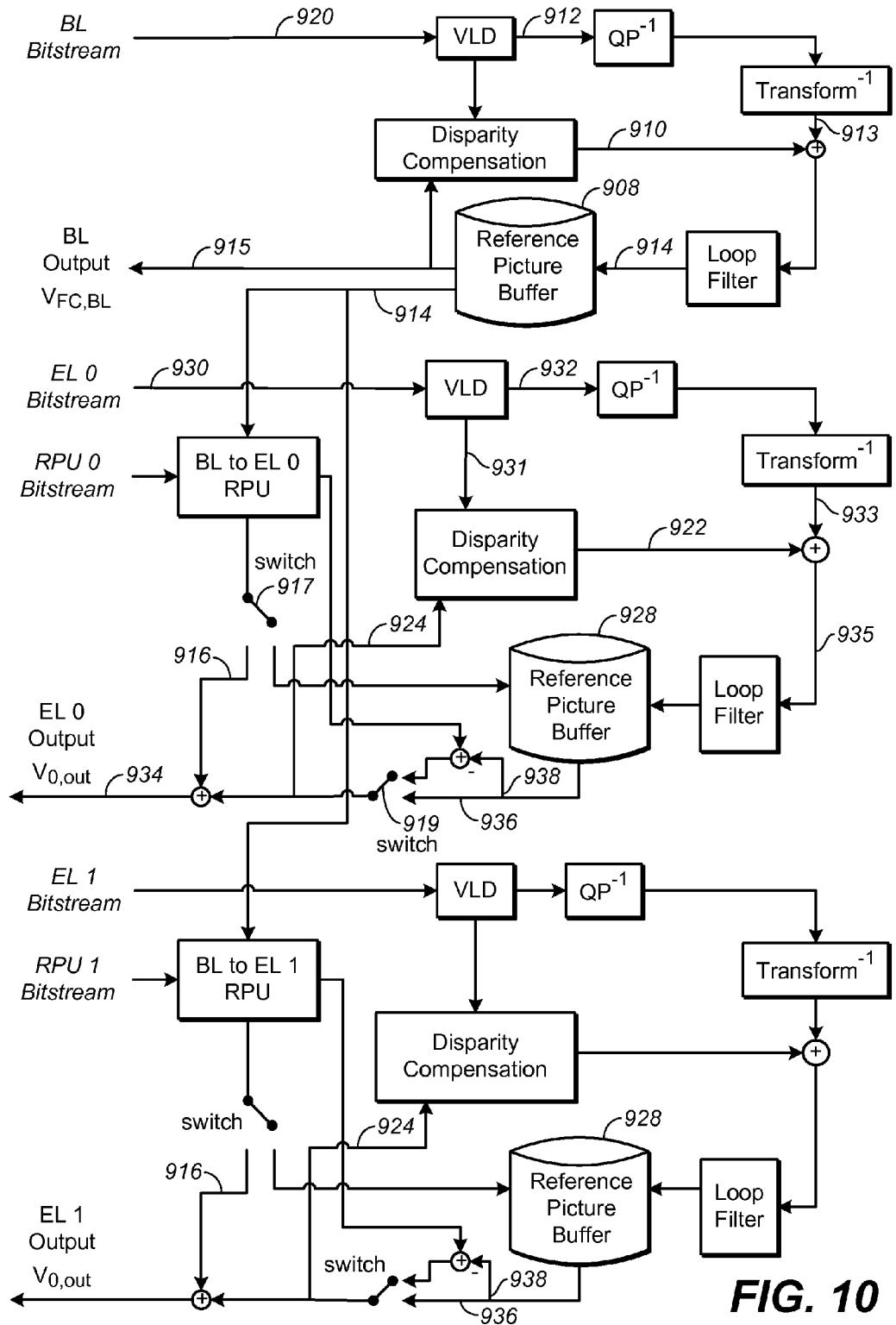
FIG. 10 depicts another exemplary multi-layer scalable video decoder that can be used with the multi-layer scalable video encoder of FIG. 9.

An example embodiment of the adaptive hybrid encoding scheme for the case of three layer coding systems of FIG. 7 and FIG. 8 is shown in FIG. 9 and FIG. 10.

FIG. 9 depicts an example multi-layer scalable video encoder comprising a base layer and two enhancement layers, each layer being associated with an encoder. A switch (917, 919) can be utilized to switch, on a region-by-region basis, whether to select picture coding mode or residual coding mode. It should be noted that each of the base layer and the enhancement layer(s) can utilize different coding modes. FIGS. 9 and 10 depict the first layer to be coded in picture coding mode whereas the second or further layers can be coded in either of picture coding mode or residual coding mode. However, residual coding mode can be applied to the first layer as well by the use of the single layer residual coding mode operation as shown in FIGS. 16 and 17, where a first layer RPU can generate an rpu-prediction for subtraction with the input signal to the first layer (902).

FIG. 9 depicts an example multi-layer scalable video encoder, which can be utilized to apply a method for encoding video image data into bitstreams (920, 930, 940). Consider that switches (917, 919, 941, 942) are set for operating the encoder in picture coding mode for the first and second layers.

As one example, consider that a reference picture buffer (928) associated with the second layer contains picture type reference pictures. The encoding method may comprise providing the video image data as input to the encoder, where the video image data can comprise pictures for a first layer (902) and pictures for at least one second layer (904). The provided pictures for the first layer (902) can be encoded to generate a first layer bitstream (920) and can be utilized to generate first layer reconstructed pictures (914). The first layer reconstructed pictures (914) can be processed by a reference processing unit (RPU, depicted as "BL to EL0 RPU" or "BL to EL1 RPU" in FIGS. 9 and 10) to generate second layer rpu-prediction pictures (916) of picture information (by setting the switch (917) out of the RPU to the lower position), where the second-layer rpu-prediction pictures can be stored in a reference picture buffer (928) associated with the second layer.

Disparity estimation and disparity compensation can be performed on the provided pictures of the second layer (904) based on second layer picture type reference pictures (924) to provide second layer disparity compensated-prediction (codec-prediction) pictures (922), where the switch (919) is set to the lower position and thus the second layer picture type reference pictures (924) are based on reference pictures (936) from the reference picture buffer (928) associated with the second layer. A difference can be taken between the provided pictures of the second layer (904) and the second layer codec-prediction pictures (922) to generate a set of second layer residual information (926). The set of second layer residual information (926) can be transformed and quantized to obtain processed second layer residual information (932), which can be entropy encoded to generate a second layer bitstream (930).

As another example, the reference picture buffer (928) associated with the second layer may contain residual type reference pictures. In such a case, disparity estimation and disparity compensation can be performed on the provided pictures of the second layer (904) based on second layer picture type reference pictures (924) to provide second layer disparity compensated-prediction (codec-prediction) pictures (922), where the switch (919) is set to the upper position and thus the second layer picture type reference pictures (924) are based on reference pictures (938) from the reference picture buffer (928) associated with the second layer. The reference pictures (938) of residual information can be added to the second-layer rpu-prediction pictures (916) to generate the second layer picture type reference pictures (924).

Similarly, the multi-layer encoder of FIG. 9 may be utilized to apply a method for encoding video image data into bitstreams (920, 930, 940), where the switches (917, 919, 941, 942) can be set for operating in residual coding mode for one or more second layers.

As one example, consider that a reference picture buffer (928) associated with the second layer contains residual type reference pictures. The encoding method may comprise the steps of providing the video image data as input to the encoder, where the video image data can comprise pictures for a first layer (902) and pictures for at least one second layer (904). The provided pictures for the first layer (902) can be encoded to generate a first layer bitstream (920) and can be utilized to generate first layer reconstructed pictures (914). The first layer reconstructed pictures (914) can be processed by a reference processing unit (RPU) to generate second layer rpu-prediction pictures (916) of picture information. By setting the switch (917) to the upper position, a difference can be taken between the second layer rpu-prediction pictures (916) and the provided pictures of the second layer (904) to generate a set of input residual information (925) for the second layer.

Disparity estimation and disparity compensation can be performed on the set of input residual information (925) for the second layer based on second layer reference pictures of residual information (924) from a reference picture buffer (928) associated with the second layer to provide second layer codec-prediction pictures (922), where the switch (919) is set to the lower position and thus the second layer residual type reference pictures (924) are based on reference pictures (936) from the reference picture buffer associated with the second layer (928). A difference can be taken between the set of input residual information (925) for the second layer and the second layer codec-prediction pictures (922) to generate a set of second layer residual information (926). The set of second layer residual information (926) can be transformed and quantized to obtain processed second layer residual information (932), which can be entropy encoded to generate the second layer bitstream (930).

As another example, the reference picture buffer (928) associated with the second layer may contain picture type reference pictures. In such a case, disparity estimation and disparity compensation can be performed on the set of input residual information (925) for the second layer based on second layer reference pictures (924) to provide second layer disparity compensated-prediction (codec-prediction) pictures (922), where the switch (919) is set to the upper position and thus the second layer reference pictures (924) are based on reference pictures (938) from the reference picture buffer (928) associated with the second layer. The reference pictures (938) of picture information can be subtracted from the second-layer rpu-prediction pictures (916) to generate the second layer residual type reference pictures (924).

It is worth noting that the switch (917, 919, 941, 942) settings that allows for operation in the picture coding mode in the second layers can route the second layer rpu-prediction pictures (916) to the reference picture buffers (928). The second layer reference pictures (924) utilized for coding are generally picture type reference pictures although the second layer reference pictures (924) can be picture type reference pictures or residual type reference pictures. In the case that the second layer reference pictures (924) are residual type reference pictures, picture type reference pictures can be generated on the fly by adding the second-layer rpu-prediction pictures (916) to the residual type reference pictures.

When the switch (917, 919, 941, 942) settings are set for residual coding mode for the second layers, or enhancement layers, the second layer rpu-prediction pictures (916) are routed to be subtracted from the provided pictures of the second layer (904) to generate a set of input residual information (925) for the second layer. The second layer reference pictures (924) utilized for coding are generally residual type reference pictures although the second layer reference pictures (924) can be picture type reference pictures or residual type reference pictures. In the case that the second layer reference pictures (924) are picture type reference pictures, residual type reference pictures can be generated by taking a difference between the second layer rpu-prediction pictures (916) and the picture type reference pictures (938) from a reference picture buffer (928) of the second layer. The difference taken to generate the second layer residual type reference pictures (924) can be conducted on the fly to generate the second layer residual type reference picture (924) from picture type reference pictures (936, 938). However, there may be circumstances, e.g., where access speed should be fast or if storage memory cost is low, such that two reference buffers, one for reference pictures of picture information and another for reference pictures of residual information may be used for each layer, as shown in the single layer example of FIGS. 16 and 17.

As part of the encoding of first layer (902) pictures, the encoder may perform disparity estimation and/or disparity compensation on the provided pictures of the first layer (902) based on first layer reference pictures (906) from a first layer reference picture buffer (908) to provide first layer disparity compensated-prediction (codec-prediction) pictures (910). A difference can be taken between the provided pictures at the first layer (902) and the first layer codec-prediction pictures (910) to generate first layer residual information (912). Transformation and quantization can be performed on the first layer residual information (912) to obtain processed first layer residual information, and the processed first layer residual information can be entropy encoded to generate a first layer bitstream (920).

Further, generation of the first layer reconstructed pictures (914) may comprise performing disparity estimation and disparity compensation on the provided pictures of the first layer (902) based on first layer reference pictures (906) from a first layer reference picture buffer (908) to provide first layer disparity compensated-prediction (codec-prediction) pictures (910); taking a difference between the pictures at the first layer (902) and the first layer codec-prediction pictures (910) to generate first layer residual information (912); and generating the first layer reconstructed pictures (914) based on the first layer codec-prediction pictures (910) and the first layer residual information (912). The first layer reconstructed pictures (914) can be stored in the first layer reference picture buffer (908).

As previously noted, the operation mode can be selected during coding for each region of each layer to be coded in picture coding mode or residual coding mode based on evaluation metrics such as resulting error metric. For example, selection of the coding mode to be utilized in coding may comprise performing both the picture coding mode and the residual coding mode for each region of each layer; calculating a cost associated with performance of both the picture coding mode and the residual coding mode; and selecting the coding mode based on the calculated cost.

FIG. 10 depicts an example multi-layer scalable video decoder that can be used with the multi-layer scalable video encoder of FIG. 9. It should be noted that, for the residual coding mode, inter-layer references can be, but need not be, stored in a reference picture buffer.

The decoder of FIG. 10 may be utilized to decode bitstreams into output images. A first layer bitstream (920) and at least one second layer bitstream (930, 940) can be provided as input to the decoder, where the first layer bitstream (920) can comprise encoded image data of a first layer and the at least one second layer bitstream (930, 940) can comprise encoded image data of at least one second layer. The encoded image data can comprise information encoded using either the picture coding mode or the residual coding mode.

Consider that the first and second layers are encoded in the picture coding mode and thus the switches (917, 919) are set for operating the decoder in the picture coding mode for the first and second layers.

The decoding method may comprise providing to the decoder a first layer bitstream (920) and at least one second layer bitstream (930). The first layer bitstream can be decoded and reconstructed to generate first layer reconstructed images (914) of picture information, where first layer output images (915) are based on the first layer reconstructed images (914) and the first layer reconstructed images (914) can be stored in a reference picture buffer (908) of the first layer, processed by at least one RPU to generate second layer rpu-prediction pictures (916), and output as decoded first layer output images (915).

Entropy decoding can be performed on the second layer bitstream (930) to obtain a processed first set of second layer residual information (932). Inverse quantization and inverse transformation can be performed on the processed first set of second layer residual information (932) to obtain a second set of second layer residual information (933). Disparity compensation can be formed based on signaled disparity information (931) from an encoder and second layer reference pictures (924) to obtain second layer codec-prediction pictures (922).

The second layer codec-prediction pictures (922) and the second set of second layer residual information (933) can be combined to obtain second layer reconstructed images (935), where the second layer reconstructed images (935) can be stored in the second layer reference picture buffer (928) and where second layer output images (934) are based on the second layer reconstructed images (935). In picture mode coding, the second layer output images (934) can be the second layer reconstructed images (935) or loop filtered second layer reconstructed images.

If the second layer reference pictures (924) are picture type reference pictures, then the switch (919) can be set to the lower position and thus second layer reference pictures (924) are based on reference pictures (936) from the reference picture buffer associated with the second layer (928). If the second layer reference pictures are residual type reference pictures, then the switch (919) can be set to the upper position and thus the second layer picture type reference pictures (924) are based on reference pictures (938) from the reference picture buffer (928) associated with the second layer. The reference pictures (938) of residual information can be added to the second-layer rpu-prediction pictures to generate the second layer picture type reference pictures (924).

Consider that the first and second layers are encoded in the residual coding mode and thus the switches (917, 919) are set for operating the decoder in the residual coding mode for the first and second layers. It should be noted that the residual coding mode for the first layer is not explicitly shown in FIG. 10.

The decoding method may comprise providing to the decoder a first layer bitstream (920) and at least one second layer bitstream (930). The first layer bitstream can be decoded and reconstructed to generate first layer reconstructed images (914) of residual information, where first layer output images (915) are based on the first layer reconstructed images (914) and the first layer reconstructed images (914) can be stored in a reference picture buffer (908) of the first layer, processed by at least one RPU to generate second layer rpu-prediction pictures (916), and output as decoded first layer output images (915).

Entropy decoding can be performed on the second layer bitstream (930) to obtain a processed first set of second layer residual information (932). Inverse quantization and inverse transformation can be performed on the processed first set of second layer residual information (932) to obtain a second set of second layer residual information (933). Disparity compensation can be performed based on signaled disparity information (933) from an encoder and second layer reference pictures (924) to obtain second layer codec-prediction pictures (922).

If the second layer reference pictures are residual type reference pictures, then the switch (919) can be set to the lower position and thus the second layer reference pictures (924) are based on reference pictures (936) from the reference picture buffer (928) associated with the second layer. If the second layer reference pictures are picture type reference pictures, then the switch (919) can be set to the upper position and thus the second layer residual type reference pictures (924) are based on reference pictures (938) from the reference picture buffer associated with the second layer (928). The reference pictures (938) of picture information can be subtracted from the second-layer rpu-prediction pictures to generate the second layer residual type reference pictures (924).

The second layer codec-prediction pictures (922) and the second set of second layer residual information (933) can be combined to obtain second layer reconstructed images (935) of residual information, where the second layer reconstructed images (935) can be stored in the second layer reference picture buffer (928) and where second layer output images (934) are based on the second layer reconstructed images (935). Second layer output images (934) can be generated by combining the second layer rpu-prediction pictures (916) and the second layer reference pictures (924).

It should be noted that the residual coding mode for the first layer is not explicitly shown in FIG. 10. However, the decoding of the first layer bitstream (920) may comprise performing entropy decoding on the first layer bitstream (920) to obtain a processed first set of first layer residual information (912). Inverse quantization and inverse transformation can be performed on the processed first set of first layer residual information (912) to obtain a second set of first layer residual information (913). Disparity compensation can be performed based on signaled disparity information (911) from an encoder and reference pictures from a first layer reference picture buffer (908) to obtain first layer disparity codec-prediction pictures (910). The first layer disparity codec-prediction pictures (910) can be combined with the second set of first layer residual information (913) to obtain the first layer reconstructed images (914) and the first layer output images (915), thus decoding the first layer bitstream (920).

Regions (e.g., blocks, pictures/frames, or sequences, etc.) can be coded either in the picture coding mode or the residual coding mode, which can then be signaled to the decoder (as already discussed). According to both single and multi-layer embodiments of the present disclosure, the residual coding mode can involve performing a subtraction of a first prediction signal from the input signal prior to its encoding using intra or inter prediction to form difference coefficients. Equivalently, at the decoder, the decoded output, which is a result of applying intra or inter prediction and sending the difference coefficients, can be added to the first prediction signal to yield the final reconstructed signal in the original signal domain.

In multi-layer codecs, the first prediction signal can be derived from samples of the base layer and/or one or more higher priority layers. An RPU can optionally be used to improve the prediction signal. In single layer codecs, the first prediction signal can comprise previously decoded samples. These previously decoded samples may come from previously decoded parts from the same frame (intra prediction associated with the first prediction signal) or some previously decoded frames (inter prediction associated with the first prediction signal). The prediction signal may also be region-based and switch among intra and inter prediction on a region-by-region basis. The RPU may be optionally used to generate this prediction signal from previously coded frames.

Similar to the multi-layer case, inter prediction can be applied in both the picture coding mode and the residual coding mode. In such embodiments of the single-layer codec, the reference picture buffer may store one of the types (picture coding mode or residual coding mode) and generate the other mode on demand. In other embodiments, the reference picture buffer may store both types, which yields a trade-off between memory and computational complexity. In the case that only residuals are stored in the reference picture buffer, other information (such as the prediction associated with the residual itself, e.g., the prediction that was subtracted from the source signal to generate the input residual signal) can be present such that the picture coding mode counterpart of the residual can be generated.

Signaling information including, for instance, prediction modes (e.g., intra or inter), motion information (e.g., motion vectors), among others, may be separately sent before the coding modes and residual information of each region is transmitted to the decoder. Alternatively, the signaling information may be embedded into each region. For example, two cascaded modes can be transmitted: a first mode used to reconstruct prediction residuals and a second used to generate a prediction that is added to a reconstructed prediction residual prior to display.

In one embodiment, the first prediction signal can be generated by adopting global motion compensation that warps a reference frame according to transmitted vectors (e.g., motion vectors; motion models such as affine, perspective, and other higher order motion models; etc.). After the warped prediction frame is subtracted from a source frame, the encoder can code the frame using the picture coding mode or the residual coding mode. At the decoder, if a present picture or region thereof has been signaled using the residual coding mode, the warped prediction frame can be added to the encoder reconstructed (residual) output to retrieve a reconstructed signal.

The methods and systems described in the present disclosure may be implemented in hardware, software, firmware, or combination thereof. Features described as blocks, modules, or components may be implemented together (e.g., in a logic device such as an integrated logic device) or separately (e.g., as separate connected logic devices). The software portion of the methods of the present disclosure may comprise a computer-readable medium which comprises instructions that, when executed, perform, at least in part, the described methods. The computer-readable medium may comprise, for example, a random access memory (RAM) and/or a read-only memory (ROM). The instructions may be executed by a processor (e.g., a digital signal processor (DSP), an application specific integrated circuit (ASIC), or a field programmable logic array (FPGA)).

All patents and publications mentioned in the specification may be indicative of the levels of skill of those skilled in the art to which the disclosure pertains. All references cited in this disclosure are incorporated by reference to the same extent as if each reference had been incorporated by reference in its entirety individually.

The examples set forth above are provided to give those of ordinary skill in the art a complete disclosure and description of how to make and use the embodiments of the hybrid encoding and decoding methods for single or multiple layered video coding systems of the disclosure, and are not intended to limit the scope of what the inventors regard as their disclosure. Modifications of the above-described modes for carrying out the disclosure may be used by persons of skill in the video art, and are intended to be within the scope of the following claims.

It is to be understood that the disclosure is not limited to particular methods or systems, which can, of course, vary. It is also to be understood that the terminology used herein is for the purpose of describing particular embodiments only, and is not intended to be limiting. As used in this specification and the appended claims, the singular forms "a", "an", and "the" include plural referents unless the content clearly dictates otherwise. Unless defined otherwise, all technical and scientific terms used herein have the same meaning as commonly understood by one of ordinary skill in the art to which the disclosure pertains.

A number of embodiments of the disclosure have been described. Nevertheless, it will be understood that various modifications may be made without departing from the spirit and scope of the present disclosure. Accordingly, other embodiments are within the scope of the following claims.

LIST OF REFERENCES

[1] "Advanced video coding for generic audiovisual services", world wide website itu.int/rec/T-REC-H.264-201003-I/en, March 2010. Website accessed Dec. 30, 2011.
[2] A. Tourapis, A. Leontaris, P. Pahalawatta, and K. Stec, "Directed Interpolation/Post-processing methods for video encoded data", U.S. Provisional Patent Application No. 61/170,995, filed Apr. 20, 2009.
[3] A. Tourapis, P. Pahalawatta, A. Leontaris, K. Stec, and W. Husak, "Encoding and Decoding Architecture for Format Compatible 3D Video Delivery", U.S. Provisional Patent Application No. 61/223,027, filed Jul. 4, 2009.
[4] P. Pahalawatta, A. Tourapis, and W. Husak, "Systems and Methods for Multi-Layered Image and Video Delivery Using Reference Processing Signals", U.S. Provisional Patent Application No. 61/362,661, filed Jul. 8, 2010.
[5] Y. He, Y. Ye, A. Tourapis, "Reference Processing Using Advanced Motion Models for Video Coding", U.S. Provisional Patent Application No. 61/366,517, filed Jul. 21, 2010.
[6] A. Leontaris, A. Tourapis, P. Pahalawatta, K. J. Stec, and W. J. Husak, "Multi-Layer Frame-Compatible Full-Resolution Video Delivery", U.S. Provisional Patent Application No. 61/366,512, filed Jul. 21, 2010.

The invention claimed is:

1. A method for encoding video image data into bitstreams, comprising:
   a) providing the video image data, the video image data comprising pictures of a first layer and pictures of at least one second layer;
   b) encoding the provided pictures for the first layer to generate a first layer bitstream;
   c) generating first layer reconstructed pictures based on the encoded provided pictures for the first layer;

d) selecting at least one coding mode, each coding mode being either a picture coding mode or a residual coding mode; and
e) performing the at least one selected coding mode;
wherein performing the picture coding mode comprises:
f) processing the first layer reconstructed pictures by a reference processing unit (RPU) to generate at least one second layer rpu-prediction picture of picture information adapted to be stored in a reference picture buffer of the at least one second layer;
g) performing disparity estimation and disparity compensation on the provided pictures of the at least one second layer based on second layer reference pictures of picture information to provide second layer disparity compensated-prediction (codec-prediction) pictures, wherein the second layer reference pictures are based on reference pictures from the reference picture buffer of the at least one second layer;
h) taking a difference between the provided pictures of the at least one second layer and the second layer codec-prediction pictures to generate a set of second layer residual information;
i) performing transformation and quantization on the second layer residual information to obtain processed second layer residual information; and
k) performing entropy encoding on the processed second layer residual information to generate the bitstream, and
wherein performing the residual coding mode comprises:
l) processing the first layer reconstructed pictures by a reference processing unit (RPU) to generate at least one second layer rpu-prediction picture of picture information;
m) taking a difference between the at least one second layer rpu-prediction picture and the provided pictures of the at least one second layer to generate a set of input residual information for the at least one second layer;
n) performing disparity estimation and disparity compensation on the set of input residual information for the at least one second layer based on second layer reference pictures of residual information to provide second layer codec-prediction pictures;
o) taking a difference between the set of input residual information for the at least one second layer and the at least one second layer codec-prediction picture to generate a set of second layer residual information;
p) performing transformation and quantization on the set of second layer residual information to obtain processed second layer residual information; and
q) performing entropy encoding on the processed second layer residual information to generate the bitstream,
wherein the generating first layer reconstructed pictures further comprises performing loop filtering on the first layer reconstructed pictures prior to storing in the reference picture buffer of the first layer,
wherein the video image data is adapted to be segmented into a plurality of regions, and wherein the selecting at least one coding mode is performed for each region in the plurality of regions, and
wherein the loop filtering is performed using a deblocking filter, and wherein filter strength of the deblocking filter is based on the selecting.

2. The method according to claim 1, wherein, in the performing the picture coding mode, the second layer reference pictures of picture information are generated from residual type reference pictures from a residual type reference picture buffer associated with the at least one second layer, the method further comprising:
generating the second layer reference pictures of picture information from the residual type reference pictures by computing a sum between the residual type reference pictures and the at least one second layer rpu-prediction picture.

3. The method according to claim 1, wherein, in the performing the picture coding mode, the second layer reference pictures of picture information are from a picture type reference picture buffer associated with the at least one second layer.

4. The method according to claim 1, wherein, in the performing the residual coding mode, the second layer reference pictures of residual information are generated from picture type reference pictures from a picture type reference picture buffer associated with the at least one second layer, the method further comprising:
generating the second layer reference pictures of residual information from the picture type reference pictures by taking a difference between the picture type reference pictures and the at least one second layer rpu-prediction picture.

5. The method according to claim 1, wherein, in the performing the residual coding mode, the second layer reference pictures of residual information are generated from picture type reference pictures from a picture type reference picture buffer associated with the at least one second layer, the method further comprising:
generating the second layer reference pictures of residual information from the picture type reference pictures by taking a difference between the picture type reference pictures and the at least one second layer rpu-prediction picture.

6. The method according to claim 1, wherein, in the performing the residual coding mode, the second layer reference pictures of residual information are from a residual type reference picture buffer associated with the at least one second layer.

7. The method according to claim 1, wherein the video image data comprises pictures for a first layer of picture information and pictures for at least one second layer of picture information.

8. The method according to claim 7, wherein the second layer reference pictures of picture information are based on the reference pictures of picture information from a reference picture buffer of the at least one second layer.

9. The method according to claim 7, wherein the second layer reference pictures of residual information are generated by taking a difference of the reference pictures of picture information from a reference picture buffer of the at least one second layer and the at least one second layer rpu-prediction picture.

10. The method according to claim 1, wherein the video image data comprises pictures for a first layer of residual information and pictures for at least one second layer of residual information.

11. The method according to claim 1, wherein the encoding the provided pictures for the first layer comprises:
performing disparity estimation and disparity compensation on the provided pictures of the first layer based on first layer reference pictures from a first layer reference picture buffer to provide first layer disparity compensated-prediction (codec-prediction) pictures;
taking a difference between the pictures at the first layer and the first layer codec-prediction pictures to generate first layer residual information;

performing transformation and quantization on the first layer residual information to obtain processed first layer residual information; and performing entropy encoding on the processed first layer residual information to generate a second layer bitstream.

12. The method according to claim 1, wherein the generating first layer reconstructed pictures comprises:

performing disparity estimation and disparity compensation on the provided pictures of the first layer based on first layer reference pictures from a first layer reference picture buffer to provide first layer disparity compensated-prediction (codec-prediction) pictures;

taking a difference between the pictures at the first layer and the first layer codec-prediction pictures to generate first layer residual information; and generating the first layer reconstructed pictures based on the first layer codec-prediction pictures and the first layer residual information, the first layer reconstructed pictures are adapted to be stored in the first layer reference picture buffer.

13. The method according to claim 1, wherein the selecting at least one coding mode comprises:

performing the picture coding mode;

performing the residual coding mode;

calculating a cost associated with performing the picture coding mode and performing the residual coding mode; and electing the at least one coding mode based on the calculated cost.

14. The method according to claim 13, wherein the selecting at least one coding mode further comprises performing one or more residual coding modes based on results of the picture coding mode, and wherein the calculating and the electing are based on each of the performed coding modes.

15. The method according to claim 1, further comprising ranking the first layer reference pictures and/or the second layer reference pictures hierarchically.

16. The method according to claim 15, wherein:

the ranking the first layer reference pictures is based on number of the pictures of the first layer or the at least one second layer that utilizes a particular first layer reference picture in the performing disparity estimation and disparity compensation, the ranking the second layer reference pictures is based on number of the pictures of the at least one second layer that utilizes a particular second layer reference picture in the performing disparity estimation and disparity compensation, and height of the ranking is proportional to the number.

17. The method according to claim 15, wherein quantization parameters used in the performing quantization is based on the height of the ranking of the reference pictures.

18. The method according to claim 17, wherein the quantization parameters associated with higher ranked reference pictures are smaller.

19. The method according to claim 1, wherein the performing of loop filtering comprises performing at least one of adaptive loop filtering, deblocking, and adaptive sample offsets.

20. The method according to claim 1, wherein neighboring regions with different selected coding modes are associated with higher filter strength.

21. The method according to claim 1, wherein the selecting is performed by a switch.

22. The method according to claim 1, wherein the first layer residual information comprises residual samples, and wherein a particular residual sample is predicted based on previously coded neighboring residual samples.

23. The method according to claim 22, wherein the neighboring residual samples are temporal and/or spatial neighbors.

24. The method according to claim 1, wherein the RPU performs at least one of resampling, frequency filtering, and motion compensation on the first layer reconstructed pictures to generate the second layer rpu-prediction pictures.

25. The method according to claim 1, wherein information on the at least one selected coding mode is adapted to be signaled to a decoder or an encoder by a signaling mechanism.

26. The method according to claim 1, wherein motion information from each of the performing disparity estimations is adapted to be signaled to a decoder or an encoder by a signaling mechanism.

27. The method according to claim 1, wherein reference indices associated with the first layer reference pictures used in the performing disparity estimation and reference indices associated with the second layer reference pictures used in the performing disparity estimation are adapted to be signaled to a decoder or an encoder by a signaling mechanism.

28. The method according to claim 17, wherein at least one of quantization parameters used in the performing quantization and loop filtering parameters in the performing loop filtering is adapted to be signaled to a decoder or an encoder by a signaling mechanism.

29. The method according to claim 25, wherein the signaling mechanism is contained in one or more of an RPU data packet, a slice, a macroblock, or a syntax of the second layer.

30. The method according to claim 1, wherein the selected coding mode of a second layer reference picture from the second layer reference picture buffer and the selected coding mode to be used for a present provided picture are different.

31. An encoding system for encoding video image data into bitstreams, the video data comprising pictures for a first layer and pictures for at least one second layer, the encoding system comprising:

a) a first layer encoder that is configured to encode the pictures for the first layer to generate a first layer bitstream;

b) a first layer reconstruction module that is configured to generate first layer reconstructed pictures based on the encoded pictures for the first layer;

c) a coding mode selection switch that is configured to select at least one coding mode module, each coding mode module being either a picture coding mode module or a residual coding mode module; and wherein, if selected, the picture coding mode module is configured to perform a picture coding mode, the picture coding mode comprising:

d) using a reference processing unit (RPU), processing the first layer reconstructed pictures using a reference processing unit (RPU) to generate at least one second layer rpu-prediction picture of picture information adapted to be stored in a reference picture buffer of the at least one second layer, wherein the reference processing unit is connected with the first layer reconstruction module;

e) using a disparity estimation module and a disparity compensation module, performing respective disparity estimation and disparity compensation on the pictures of the at least one second layer based on second layer reference pictures of picture information to provide second layer disparity compensated-prediction (codec-prediction) pictures, wherein the second layer reference pictures are based on reference pictures from the reference picture buffer of the at least one second layer;

f) using a first summing module connected with the disparity compensation module, taking a difference between the pictures of the at least one second layer and the second layer codec-prediction pictures to generate a set of second layer residual information;

g) using a transformation module and a quantization module, performing respective transformation and quantization on the second layer residual information to obtain processed second layer residual information, wherein the transformation module is connected with the first summing module; and h) using an entropy encoder connected with the quantization module, performing entropy encoding on the processed second layer residual information to generate the bitstream, and wherein, if selected, the residual coding mode module is configured to perform a residual coding mode, the residual coding mode comprising:

d) using the reference processing unit (RPU), processing the first layer reconstructed pictures to generate at least one second layer rpu-prediction picture of picture information;

e) using a second summing module, taking a difference between the at least one second layer rpu-prediction picture and the pictures of the at least one second layer to generate a set of input residual information for the at least one second layer, wherein the second summing module is connected with the reference processing unit;

f) using a disparity estimation module and a disparity compensation module, performing respective disparity estimation and disparity compensation on the set of input residual information for the at least one second layer based on second layer reference pictures of residual information to provide second layer codec-prediction pictures;

g) using the first summing module, taking a difference between the set of input residual information for the at least one second layer and the at least one second layer codec-prediction picture to generate a set of second layer residual information, wherein the first summing module is connected with the disparity compensation module;

h) using the transformation module and the quantization module, performing respective transformation and quantization on the set of second layer residual information to obtain processed second layer residual information; and i) using the entropy encoder connected with the quantization module, performing entropy encoding on the processed second layer residual information to generate the bitstream, wherein the first layer reconstruction module comprises a loop filter that is configured to perform loop filtering on the first layer reconstructed pictures prior to storing in the reference picture buffer of the first layer, wherein the video image data is adapted to be segmented into a plurality of regions, and wherein the coding mode selection switch is configured to select at least one coding mode for each region in the plurality of regions, and wherein the performing of loop filtering is performed using a deblocking filter, and wherein filter strength of the deblocking filter is based on selected coding mode.

32. The encoding system according to claim 31, wherein, in the picture coding mode module, the second layer reference pictures of picture information are generated from residual type reference pictures from a residual type reference picture buffer associated with the at least one second layer, the picture coding mode module further comprising:

a summing module connected with the residual type reference picture buffer and that is configured to generate the second layer reference pictures of picture information from the residual type reference pictures by computing a sum between the residual type reference pictures and the at least one second layer rpu-prediction picture.

\* \* \* \* \*